United States Patent
Marumoto et al.

(10) Patent No.: US 9,513,000 B2
(45) Date of Patent: Dec. 6, 2016

(54) OXYGEN COMBUSTION SYSTEM AND METHOD FOR OPERATING SAME

(75) Inventors: Takahiro Marumoto, Kure (JP); Hidehisa Yoshizako, Kure (JP); Kenji Kiyama, Kure (JP); Kenso Arita, Kure (JP); Pauli Dernjatin, Helsinki (FI)

(73) Assignee: Mitsubishi Hitachi Power Systems, Ltd., Yokohama-Shi (JP)

( * ) Notice: Subject to any disclaimer, the term of this patent is extended or adjusted under 35 U.S.C. 154(b) by 916 days.

(21) Appl. No.: 13/825,157

(22) PCT Filed: Sep. 29, 2011

(86) PCT No.: PCT/JP2011/005518
§ 371 (c)(1),
(2), (4) Date: Jun. 4, 2013

(87) PCT Pub. No.: WO2012/042892
PCT Pub. Date: Apr. 5, 2012

(65) Prior Publication Data
US 2013/0244190 A1    Sep. 19, 2013

(30) Foreign Application Priority Data

Sep. 29, 2010  (JP) ................................. 2010-218457
Oct. 1, 2010   (JP) ................................. 2010-223523

(51) Int. Cl.
F23L 7/00    (2006.01)
F23J 15/02   (2006.01)
(Continued)

(52) U.S. Cl.
CPC ............... F23L 7/007 (2013.01); F01K 7/40 (2013.01); F22B 1/18 (2013.01); F23C 9/00 (2013.01);
(Continued)

(58) Field of Classification Search
CPC .......... F23L 7/007; F23L 15/04; F23C 9/00; F23D 14/66

USPC ....................................................... 237/12.1
See application file for complete search history.

(56) References Cited

U.S. PATENT DOCUMENTS 5,911,956 A * 6/1999 Viel Lamare .......... B01D 53/56
110/245
7,240,504 B2 * 7/2007 Cho ......................... F02G 5/02
62/238.7

(Continued)

FOREIGN PATENT DOCUMENTS

| GB | 1355952 A * | 6/1974 | ........... F01K 23/103 |
|---|---|---|---|
| GB | WO 2010136795 A2 * | 12/2010 | ............... F22D 1/02 |
| JP | 5026409 A | 2/1993 | |
| JP | 5231609 A | 9/1993 | |
| JP | 2004077116 A | 3/2004 | |
| JP | 2004154683 A | 6/2004 | |
| JP | 2007147162 A | 6/2007 | |
| WO | 2009110031 A1 | 9/2009 | |

OTHER PUBLICATIONS

International Search Report for PCT/JP2011/005518 dated Nov. 15, 2011.

*Primary Examiner* — Steven B McAllister
*Assistant Examiner* — Rabeeul Zuberi
(74) *Attorney, Agent, or Firm* — Heslin Rothenberg Farley & Mesiti P.C.

(57) ABSTRACT

An oxygen combustion system includes a boiler to burn fuel using combustion gas composed of oxygen-rich gas and circulating flue gas, a dust remover disposed in a flue through which flue gas discharged from the boiler flows, a second flue leading the combustion gas to the boiler, the combustion gas being made by mixing the circulating flue gas extracted downstream of the dust remover with the oxygen-rich gas, a combustion gas heater exchanging heat between the flue gas flowing between the boiler and dust remover and the combustion gas flowing through the second flue, and a flue gas cooler disposed between the heater and the dust remover to cool the flue gas. A control unit controls at least one of a flow rate and cooling medium temperature of the flue gas cooler such that temperature of the flue gas introduced into the dust remover will be between 90° C. and 140° C.

10 Claims, 16 Drawing Sheets

(51) Int. Cl.
*F23D 14/66* (2006.01)
*F23C 9/00* (2006.01)
*F01K 7/40* (2006.01)
*F22B 1/18* (2006.01)
*F23J 15/06* (2006.01)
*F23C 9/08* (2006.01)
*F23L 15/04* (2006.01)

(52) U.S. Cl.
CPC .............. *F23C 9/08* (2013.01); *F23D 14/66* (2013.01); *F23J 15/022* (2013.01); *F23J 15/06* (2013.01); *F23L 15/04* (2013.01); *F23J 2215/50* (2013.01); *Y02E 20/322* (2013.01); *Y02E 20/344* (2013.01)

(56) References Cited

U.S. PATENT DOCUMENTS

| | | | |
|---|---|---|---|
| 2004/0187688 A1* | 9/2004 | Liebig | B01D 19/0047 95/251 |
| 2008/0184880 A1* | 8/2008 | Fan | B01D 53/002 95/40 |
| 2009/0257941 A1* | 10/2009 | Rudberg | C01B 31/20 423/438 |
| 2009/0272300 A1* | 11/2009 | Yamada | F22B 35/002 110/190 |
| 2009/0297993 A1* | 12/2009 | Fan | F22B 35/001 431/4 |

* cited by examiner

OXYGEN COMBUSTION SYSTEM AND METHOD FOR OPERATING SAME

CROSS REFERENCE TO RELATED APPLICATIONS

This application is the U.S. National Filing of PCT Application No. PCT/JP2011/005518 filed on Sep. 29, 2011 and published in Japanese as WO 2012/042892 on Apr. 5, 2012, and claims priority of Japanese applications JP 2010-218457 filed on Sep. 29, 2010 and JP 2010-223523 filed on Oct. 1, 2010, the entire disclosure of these applications being hereby incorporated herein by reference.

TECHNICAL FIELD

The present invention relates to an oxygen combustion system and an operating method therefor, and more particularly, to an oxygen combustion system equipped with a boiler adapted to burn fuel using combustion gas made of a mixture of oxygen-rich gas and circulating flue gas.

BACKGROUND ART

In conventional thermal power plants, air combustion systems equipped with an air combustion boiler adapted to burn fuel using air are in the mainstream. On the other hand, thermal power generation using an oxygen combustion system has been proposed as a method which makes it easy to recover carbon dioxide ($CO_2$), which is one of causative substances of global warming and is emitted in the largest amount in industrial activities.

The oxygen combustion system supplies combustion gas to a boiler together with fossil fuel such as coal, burns the fossil fuel, and thereby discharges flue gas composed principally of $CO_2$ and $H_2O$, where the combustion gas is made by mixing part of the flue gas discharged from a boiler of an existing air combustion system with high-concentration oxygen (hereinafter referred to as oxygen for short, as appropriate) produced by an air separator. Consequently, $CO_2$ can be separated easily from the flue gas by compressing and cooling the flue gas (see, for example, Patent Literatures 1 and 2).

CITATION LIST

Patent Literature

Patent Literature 1: JP-A-05-26409
Patent Literature 2: JP-A-2009-270753

SUMMARY OF INVENTION

Technical Problem

However, although the flue gas discharged from the oxygen combustion system is composed principally of $CO_2$ and $H_2O$, the flue gas contains a high concentration of SOx attributable to a sulfur component in the fuel. Consequently, for example, if room temperature oxygen is mixed in part of the flue gas, lowering flue gas temperature to or below an acid dew point, acid dew-point corrosion might occur in ducts, piping, and equipment or condensed SOx or the like might stick to soot particles (ash and the like) contained in the flue gas, clogging the ducts, piping, and the like.

An object of the present invention is to provide an oxygen combustion system which can inhibit acid dew-point corrosion of ducts, piping, equipment, and the like as well as clogging of ducts, piping, and the like with soot particles.

Solution to Problem

The present inventor conducted detailed studies on the relationship between $SO_3$ concentration in flue gas and acid dew-point temperature. Consequently, the present inventor found a phenomenon in which acid dew-point temperature changes rapidly from approximately 140° C. to approximately 90° C. in a specific narrow $SO_3$ concentration range regardless of a content ratio of a sulfur (S) component in coal used as raw material or moisture concentration in the flue gas as shown in FIG. 2, and thus made the present invention.

Specifically, the present invention provides an oxygen combustion system comprising: a boiler adapted to burn fuel using combustion gas made of a mixture of oxygen-rich gas and circulating flue gas containing 25% to 40% of water; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; a flue gas cooler disposed in the flue between the combustion gas heater and the dust remover and adapted to cool the flue gas by exchanging heat between the flue gas running through the flue and a cooling medium; and control means adapted to control at least one of a flow rate and temperature of the cooling medium of the flue gas cooler such that temperature of the flue gas introduced into the dust remover will be between 90° C. and 140° C. (both inclusive).

Consequently, the flue gas cooled by the flue gas cooler is introduced into the dust remover in a state of being cooled to a predetermined temperature between 90° C. and 140° C. (both inclusive). In so doing, $SO_3$ in the flue gas condenses on an inlet side of the dust remover, forming sulfuric acid mist, and is removed by the dust remover, sticking to soot particles in the flue gas. As a result, the $SO_3$ concentration in the flue gas is reduced during passage through the dust remover, and the acid dew-point temperature falls accordingly as well. Here, whereas the flue gas temperature almost does not change before and after passage through the dust remover, the acid dew-point temperature falls greatly. Consequently, after passage through the dust remover, since difference between the flue gas temperature and the acid dew-point temperature increases, the temperature of the flue gas will never fall below the acid dew-point temperature even if, for example, the temperature of the circulating flue gas decreases due to heat radiation and the like before the circulating flue gas reaches the combustion gas heater. This makes it possible to inhibit acid dew-point corrosion and clogging of ducts. On the other hand, the $SO_3$ concentration in the flue gas discharged from the boiler depends on the S component in the coal used as raw material, and thus can be kept at a predetermined concentration by managing, for example, the coal type, composition, and the like of the source coal to be used.

Furthermore, the present invention comprises: an air separator adapted to produce the oxygen-rich gas by separating nitrogen from air; and an oxygen introduction channel used to introduce the oxygen-rich gas produced by the air separator into the combustion gas pipe on an upstream side of the combustion gas heater, wherein the oxygen introduction channel is provided with heating means adapted to heat oxygen flowing through the oxygen introduction channel.

This makes it possible, for example, to supply the combustion gas pipe with oxygen heated to a temperature comparable to that of the circulating flue gas flowing through that part where the oxygen is supplied, and consequently, the temperature of a contact surface placed in contact with the circulating flue gas and the temperature of the circulating flue gas after mixing can be kept at a level equal to or higher than water dew point and acid dew-point temperatures. Thus, even if the circulating flue gas is recirculated without removing moisture, it is possible to inhibit acid dew-point corrosion, and clogging with ash, of heat exchangers and the like.

Furthermore, the oxygen combustion system according to the present invention comprises: an air introduction port adapted to introduce air into the combustion gas pipe; a first valve unit adapted to switch gas to be introduced into the combustion gas pipe between the circulating flue gas and air; a water supply conduit adapted to exchange heat between steam condensate obtained by a steam condenser of a steam system of the boiler and bleed steam using a condensate heater and to supply the steam condensate heated by the condensate heater to the boiler; a bleed valve installed on a steam introduction conduit and adapted to open and close the steam introduction conduit, the steam introduction conduit being adapted to introduce the bleed steam into the condensate heater; a condensate bypass conduit adapted to allow the steam condensate to run by bypassing the condensate heater; a second valve unit adapted to switch a flow channel of the steam condensate in the water supply conduit between the condensate heater and the condensate bypass conduit; a flue gas bypass conduit adapted to allow the flue gas to run by bypassing a flow channel which links an output port disposed in the flue between the combustion gas heater and the dust remover with a return port on the downstream side of the output port; a third valve unit adapted to switch a flow channel of the flue gas between the flow channel linking the output port with the return port and the flue gas bypass conduit, wherein the flue gas cooler is configured to be able to exchange heat between the steam condensate running through the condensate bypass conduit and the flue gas running through the flue gas bypass conduit.

Consequently, by switching the first valve unit, it is possible to switch back and forth between oxygen combustion which involves burning fuel by supplying combustion gas to the boiler and air combustion which involves burning fuel by supplying air to the boiler. Here, whereas the combustion gas of relatively high temperature flows into the combustion gas heater during oxygen combustion, air of relatively low temperature (e.g., room temperature) flows into the combustion gas heater during air combustion. That is, an amount of heat exchanged by the combustion gas heater is larger during air combustion than during oxygen combustion, and thus the temperature of the flue gas flowing through the flue between the combustion gas heater and the dust remover is lower during air combustion than during oxygen combustion. Therefore, switching between air combustion and oxygen combustion will upset thermal balance.

In this respect, according to the present invention, by operating the second valve unit and the third valve unit, it is possible to make the flue gas and the steam condensate flow to the flue gas cooler only during oxygen combustion and to cool the flue gas by exchanging heat with the steam condensate. Consequently, the temperature of the flue gas introduced into the dust remover can be kept at approximately equal levels during oxygen combustion and during air combustion, making it possible to maintain thermal balance. Also, since steam condensate is used as a cooling medium for the flue gas, the present invention can increase thermal efficiency of the entire system. Incidentally, by closing the bleed valve of the condensate heater to be bypassed during oxygen combustion and opening the bleed valve of the condensate heater to be bypassed during air combustion, it is possible to heat the steam condensate to a predetermined temperature both during oxygen combustion and air combustion.

Incidentally, as an ancillary device, the boiler is provided, for example, with a coal crusher whose sliding portion is sealed by air, but the air entering the boiler is consumed by combustion during oxygen combustion, causing the $CO_2$ concentration in the flue gas to decrease. On the other hand, a flue gas treatment system which purifies the flue gas discharged from the boiler is provided as an ancillary device with, for example, a soot sweeper of the dust remover, and collected soot particles are swept off by aeration which involves running air. This can cause air to be mixed in the flue gas during oxygen combustion, causing the $CO_2$ concentration in the flue gas to decrease.

If the $CO_2$ concentration in the flue gas decreases in this way, recovery efficiency in separating and recovering $CO_2$ from the flue gas falls. For example, with a compression and separation method which involves recovering $CO_2$ in a liquefied state by compressing the flue gas containing the $CO_2$ using a compressor, there is a problem in that larger compressor power is required for separation and recovery. Also, the compression and separation method has a drawback in that when air flows in, Nitrogen ($N_2$) which makes up most part of air will cause an increase in the amount of $N_2$ in the flue gas, which, when used to dilute oxygen-rich combustion gas, will increase an amount of NOx generation in the combustion apparatus.

Thus, the present invention provides an oxygen combustion system comprising: a boiler adapted to burn fuel using combustion gas made of a mixture of oxygen-rich gas and circulating flue gas containing 25% to 40% of water; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; a flue gas cooler disposed in the flue between the combustion gas heater and the dust remover and adapted to cool the flue gas by exchanging heat between the flue gas running through the flue and a cooling medium; control means adapted to control at least one of a flow rate and temperature of the cooling medium of the flue gas cooler such that temperature of the flue gas introduced into the dust remover will be between 90° C. and 140° C. (both inclusive); and a working gas supply device adapted to supply working gas which is used in an ancillary device of at least one of the boiler and a flue gas treatment system and intrudes into the flue gas, the flue gas treatment system being adapted to purify the flue gas discharged from the boiler, wherein the working gas supply device uses the flue gas from which soot particles have been collected by the dust remover, as the working gas.

In this way if the flue gas is used as working gas for an ancillary device of the combustion plant, even if the working gas leaks or intrudes into the flue gas, decreases in the $CO_2$ concentration in the flue gas can be curbed. Consequently, the $CO_2$ separation and recovery efficiency can be kept at a high level and increases in compressor power can be curbed. In this case, desirably part of the flue gas at least subjected to dust removal is extracted and supplied as the working gas because this can prevent a working gas supply pipe from being clogged by soot particles.

Also, the present invention provides an oxygen combustion system comprising: a boiler adapted to burn fuel using combustion gas made of a mixture of oxygen-rich gas and circulating flue gas; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; a flue gas cooler disposed in the flue between the combustion gas heater and the dust remover and adapted to cool the flue gas by exchanging heat between the flue gas running through the flue and a cooling medium; control means adapted to control at least one of a flow rate and temperature of the cooling medium of the flue gas cooler such that temperature of the flue gas introduced into the dust remover will be between 90° C. and 140° C. (both inclusive); an air separator adapted to produce the oxygen-rich gas by separating nitrogen from air; an oxygen introduction channel used to introduce the oxygen-rich gas produced by the air separator into the combustion gas pipe on an upstream side of the combustion gas heater, the oxygen introduction channel being provided with heating means adapted to heat oxygen flowing through the oxygen introduction channel; an air introduction port adapted to introduce air into the combustion gas pipe; a first valve unit adapted to switch gas to be introduced into the combustion gas pipe between the circulating flue gas and air; a water supply conduit adapted to exchange heat between steam condensate obtained by a steam condenser of a steam system of the boiler and bleed steam using a condensate heater and to supply the steam condensate heated by the condensate heater to the boiler; a bleed valve installed on a steam introduction conduit and adapted to open and close the steam introduction conduit, the steam introduction conduit being adapted to introduce the bleed steam into the condensate heater; a condensate bypass conduit adapted to allow the steam condensate to run by bypassing the condensate heater; a second valve unit adapted to switch a flow channel of the steam condensate in the water supply conduit between the condensate heater and the condensate bypass conduit; a flue gas bypass conduit adapted to allow the flue gas to run by bypassing a flow channel which links an output port disposed in the flue between the combustion gas heater and the dust remover with a return port on the downstream side of the output port; and a third valve unit adapted to switch a flow channel of the flue gas between the flow channel linking the output port with the return port and the flue gas bypass conduit, wherein the flue gas cooler is configured to be able to exchange heat between the steam condensate running through the condensate bypass conduit and the flue gas running through the flue gas bypass conduit.

Also, the present invention provides an oxygen combustion system comprising: a boiler adapted to burn fuel using combustion gas made of a mixture of oxygen-rich gas and circulating flue gas containing 25% to 40% of water; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; a flue gas cooler disposed in the flue between the combustion gas heater and the dust remover and adapted to cool the flue gas by exchanging heat between the flue gas running through the flue and a cooling medium; control means adapted to control at least one of a flow rate and temperature of the cooling medium of the flue gas cooler such that temperature of the flue gas introduced into the dust remover will be between 90° C. and 140° C. (both inclusive); an air separator adapted to produce the oxygen-rich gas by separating nitrogen from air; an oxygen introduction channel used to introduce the oxygen-rich gas produced by the air separator into the combustion gas pipe on an upstream side of the combustion gas heater, the oxygen introduction channel being provided with heating means adapted to heat oxygen flowing through the oxygen introduction channel; and a working gas supply device adapted to supply working gas which is used in an ancillary device of at least one of the boiler and a flue gas treatment system and intrudes into the flue gas, the flue gas treatment system being adapted to purify the flue gas discharged from the boiler, wherein the working gas supply device uses the flue gas from which soot particles have been collected by the dust remover, as the working gas.

Also, the present invention provides an oxygen combustion system comprising: a boiler adapted to burn fuel using combustion gas made of a mixture of oxygen-rich gas and circulating flue gas; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; a flue gas cooler disposed in the flue between the combustion gas heater and the dust remover and adapted to cool the flue gas by exchanging heat between the flue gas running through the flue and a cooling medium; control means adapted to control at least one of a flow rate and temperature of the cooling medium of the flue gas cooler such that temperature of the flue gas introduced into the dust remover will be between 90° C. and 140° C. (both inclusive); an air introduction port adapted to introduce air into the combustion gas pipe; a first valve unit adapted to switch gas to be introduced into the combustion gas pipe between the circulating flue gas and air; a water supply conduit adapted to exchange heat between steam condensate obtained by a steam condenser of a steam system of the boiler and bleed steam using a condensate heater and to supply the steam condensate heated by the condensate heater to the boiler; a bleed valve installed on a steam introduction conduit and adapted to open and close the steam introduction conduit, the steam introduction conduit being adapted to introduce the bleed steam into the condensate heater; a condensate bypass conduit adapted to allow the steam condensate to run by bypassing the condensate heater; a second valve unit adapted to switch a flow channel of the steam condensate in the water supply conduit between the condensate heater and the condensate bypass conduit; a flue gas bypass conduit adapted to allow the flue gas to run by bypassing a flow channel which links an output port disposed in the flue between the combustion gas heater and the dust remover with a return port on the downstream side of the output port; and a third valve unit adapted to switch a flow channel of the flue gas between the flow channel linking the output port with the return port and the flue gas bypass conduit; a working gas supply device adapted to supply working gas which is used in an ancillary device of at least one of the boiler and a flue gas treatment system and intrudes into the flue gas, the flue gas treatment system being adapted to purify the flue gas discharged from the boiler, wherein the flue gas cooler is configured to be able to exchange heat between the steam condensate running through the condensate bypass conduit and the flue gas running through the flue gas bypass conduit, and the working gas supply device uses the flue gas from which soot particles have been collected by the dust remover, as the working gas.

Also, the present invention provides an oxygen combustion system comprising: a boiler adapted to burn fuel using combustion gas made of a mixture of oxygen-rich gas and circulating flue gas; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; a flue gas cooler disposed in the flue between the combustion gas heater and the dust remover and adapted to cool the flue gas by exchanging heat between the flue gas running through the flue and a cooling medium; control means adapted to control at least one of a flow rate and temperature of the cooling medium of the flue gas cooler such that temperature of the flue gas introduced into the dust remover will be between 90° C. and 140° C. (both inclusive); an air separator adapted to produce the oxygen-rich gas by separating nitrogen from air; an oxygen introduction channel used to introduce the oxygen-rich gas produced by the air separator into the combustion gas pipe on an upstream side of the combustion gas heater, the oxygen introduction channel being provided with heating means adapted to heat oxygen flowing through the oxygen introduction channel; and an air introduction port adapted to introduce air into the combustion gas pipe; a first valve unit adapted to switch gas to be introduced into the combustion gas pipe between the circulating flue gas and air; a water supply conduit adapted to exchange heat between steam condensate obtained by a steam condenser of a steam system of the boiler and bleed steam using a condensate heater and to supply the steam condensate heated by the condensate heater to the boiler; a bleed valve installed on a steam introduction conduit and adapted to open and close the steam introduction conduit, the steam introduction conduit being adapted to introduce the bleed steam into the condensate heater; a condensate bypass conduit adapted to allow the steam condensate to run by bypassing the condensate heater; a second valve unit adapted to switch a flow channel of the steam condensate in the water supply conduit between the condensate heater and the condensate bypass conduit; a flue gas bypass conduit adapted to allow the flue gas to run by bypassing a flow channel which links an output port disposed in the flue between the combustion gas heater and the dust remover with a return port on the downstream side of the output port; and a third valve unit adapted to switch a flow channel of the flue gas between the flow channel linking the output port with the return port and the flue gas bypass conduit; and a working gas supply device adapted to supply working gas which is used in an ancillary device of at least one of the boiler and a flue gas treatment system and intrudes into the flue gas, the flue gas treatment system being adapted to purify the flue gas discharged from the boiler, wherein the flue gas cooler is configured to be able to exchange heat between the steam condensate running through the condensate bypass conduit and the flue gas running through the flue gas bypass conduit, and the working gas supply device uses the flue gas from which soot particles have been collected by the dust remover, as the working gas.

Also, the present invention provides an operating method for an oxygen combustion system which comprises: a boiler adapted to burn fuel using combustion gas made of a mixture of oxygen-rich gas and circulating flue gas containing 25% to 40% of water; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; and a flue gas cooler disposed in the flue between the combustion gas heater and the dust remover and adapted to cool the flue gas by exchanging heat between the flue gas running through the flue and a cooling medium, wherein the operating method adjusts temperature of the flue gas passing through the flue gas cooler so as to keep the temperature of the flue gas introduced into the dust remover between 90° C. and 140° C. (both inclusive) during oxygen combustion operation which involves burning the fuel by supplying combustion gas to the boiler.

Advantageous Effects of Invention

The present invention can inhibit acid dew-point corrosion of ducts, piping, equipment, and the like as well as clogging of ducts, piping, and the like with soot particles.

BRIEF DESCRIPTION OF THE DRAWINGS

FIG. 8(a) is a vertical sectional view of the oxygen mixer along a gas running direction and FIG. 8(b) is a horizontal sectional view of the oxygen mixer along a direction orthogonal to the gas running direction.

DESCRIPTION OF EMBODIMENTS

First Embodiment

Figure 1:
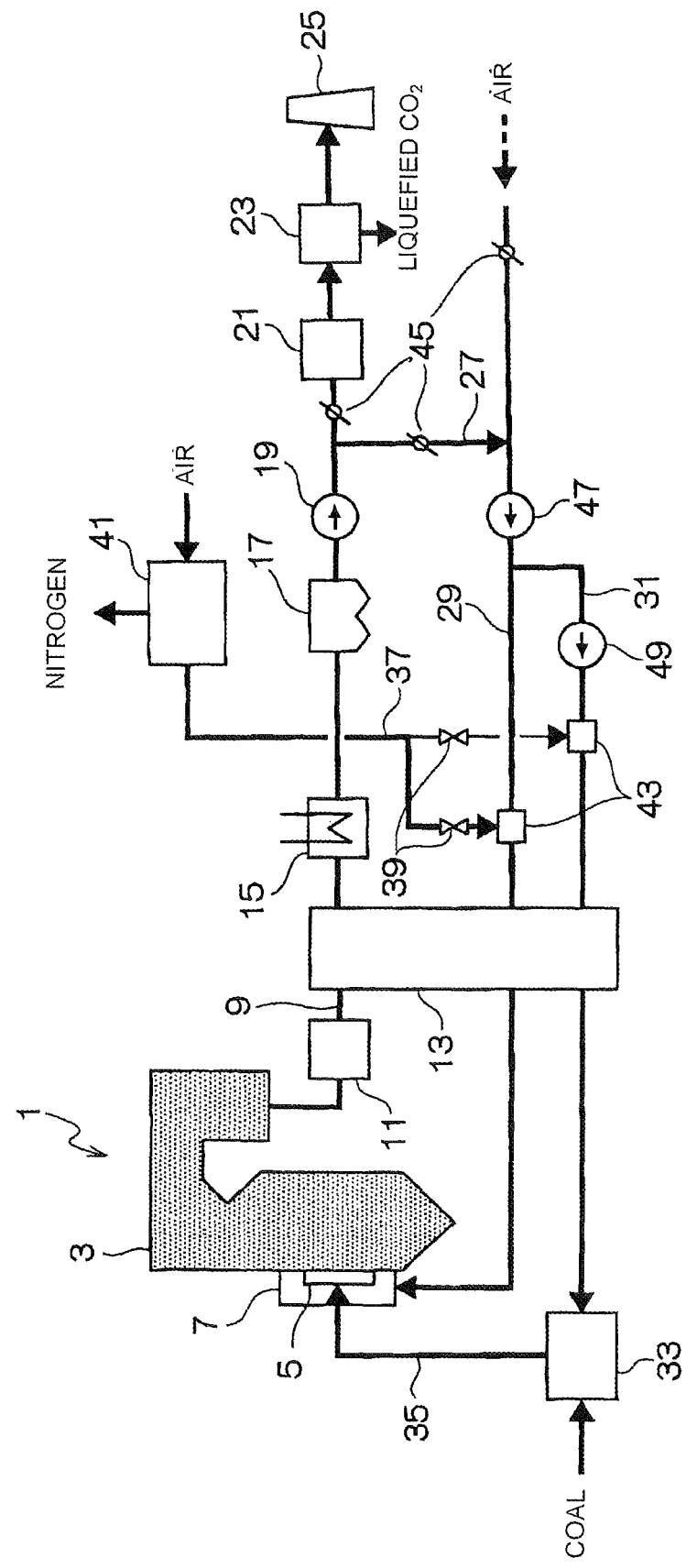
FIG. 1 is a system diagram showing a configuration of a first embodiment of an oxygen combustion system resulting from application of the present invention.

A first embodiment of an oxygen combustion system resulting from application of the present invention will be described in detail below with reference to FIG. 1. The oxygen combustion system shown in FIG. 1 can be constructed by adding equipment needed for oxygen combustion and thereby changing the configuration and system based on an already-existing air combustion system. For example, the oxygen combustion system operates as an air combustion type system at system start-up, and operates as an oxygen combustion type system described below during oxygen combustion operation, which involves burning fuel by supplying combustion gas to the boiler, after entering steady operation. It should be noted that although in the present embodiment, pulverized coal is described as an example of fossil fuel burned in the boiler, the present invention is not limited to this.

A boiler 1 includes a furnace 3 as well as a burner 5 and wind box 7 mounted in the furnace 3. The burner 5 is installed by being contained in the wind box 7. A fuel channel through which pulverized coal is supplied as fuel and combustion gas channel through which combustion gas is supplied are formed in the burner 5.

A first flue 9 through which flue gas runs is connected to an outlet of the boiler 1. Midway along the first flue 9, a denitrification device 11, a combustion gas heater 13, a flue gas cooler 15, a dust remover 17, an induced draft fan 19, a desulfurizer 21, a flue gas liquefier 23, and a chimney 25 are disposed in order starting from the upstream side. A flue gas recirculation duct 27 of a combustion gas pipe is connected to the first flue 9 to extract part of the flue gas by branching off from the flue interconnecting the induced draft fan 19 and desulfurizer 21. The flue gas recirculation duct 27 is connected to some midpoint in a second flue 29 of the combustion gas pipe, the second flue 29 being adapted to send combustion gas to the burner 5. Incidentally, the flue gas recirculation duct 27 may be branched off from the first flue 9 on a downstream side of the desulfurizer 21.

The second flue 29 serves as an air intake port at one end and is connected at the other end to the combustion gas channel of the boiler 1. By branching the flue on the downstream side of the part where the flue gas recirculation duct 27 is connected, the second flue 29 is connected with a fuel transport gas duct 31 adapted to extract part of the flue gas (hereinafter referred to as circulating flue gas) flowing through the second flue 29, and an outlet ahead of the fuel transport gas duct 31 is connected to a coal pulverizer 33.

Fuel coal is supplied to the coal pulverizer 33 and pulverized to a particle size suitable for pulverized coal firing by a coal pulverizing mill or the like (not shown) contained in the coal pulverizer 33. The pulverized coal resulting from crushing is designed to be supplied to the fuel channel of the burner 5 through a fuel transport pipe 35 by being accompanied by the circulating flue gas supplied through the fuel transport gas duct 31.

The second flue 29 and the fuel transport gas duct 31 are connected with outlets from respective branches of an oxygen introduction pipe 37. A valve 39 is disposed in each branch of the oxygen introduction pipe 37. On the other hand, an inlet portion of the oxygen introduction pipe 37 on the opposite side is connected with an air separator 41. Consequently, the oxygen generated by the air separator 41 is designed to be supplied to the second flue 29 and the fuel transport gas duct 31 via the oxygen introduction pipe 37, which is an oxygen introduction channel.

The air separator 41 is intended to generate high-concentration oxygen with a concentration of 95% vd (dry-basis volume percentage) or above by separating nitrogen and the like from air. The oxygen generated by the air separator 41 is divided by adjusting openings of the two valves 39—for coal transport (burner primary) and combustion (burner secondary, tertiary, and after-air), respectively—and resulting portions of oxygen are supplied to the second flue 29 and fuel transport gas duct 31, respectively. The oxygen is mixed with the circulating flue gas flowing through the second flue 29 and fuel transport gas duct 31 and thereby adjusted to a practical oxygen concentration (e.g., 26% to 29% vw: wet-basis volume percentage).

An oxygen mixing device 43 equipped with plural nozzles adapted to blow, for example, the oxygen supplied from the oxygen introduction pipe 37 into the circulating flue gas is connected to tip portions where the oxygen introduction pipe 37 is connected to the second flue 29 and the fuel transport gas duct 31, respectively. The oxygen supplied from the oxygen mixing device 43 is designed to be mixed quickly and uniformly with the circulating flue gas passing through the oxygen mixing device 43.

The combustion gas heater 13 is disposed on the first flue 9, second flue 29, and fuel transport gas duct 31. The combustion gas heater 13 is designed to exchange heat between flue gas and circulating flue gas as the flue gas is flowing between the denitrification device 11 and flue gas cooler 15 in the first flue 9 while the circulating flue gas is flowing through the second flue 29 on the downstream side of the oxygen mixing device 43 as well as through the fuel transport gas duct 31 on the downstream side of the oxygen mixing device 43. Consequently, the circulating flue gas flowing through the second flue 29 or fuel transport gas duct 31 is led to the combustion gas heater 13 in a state of being mixed with oxygen and is heated by exchanging heat with the flue gas flowing through the first flue 9.

One each of dampers 45*a*-*c* (refer to FIG. 11) which serve as first valve units is disposed in that part of the first flue 9 which is located between a branch point to the flue gas recirculation duct 27 and the desulfurizer 21, in the flue gas recirculation duct 27, and in that part of the second flue 29 which is located on the upstream side of a connection point with the flue gas recirculation duct 27. Amounts of flue gas extracted from the first flue 9 are designed to be adjusted by adjusting openings of the respective dampers 45*a*,*b*.

A forced draft fan 47 is disposed in that part of the second flue 29 which is located between a connection point with the flue gas recirculation duct 27 and a branch point to the fuel transport gas duct 31. Also, a primary gas fan 49 is disposed in that part of the fuel transport gas duct 31 which is located on the upstream side of the oxygen mixing device 43. The amount of circulating flue gas flowing through the second flue 29 (i.e., amount of combustion gas supplied to the burner 5) and amount of circulating flue gas flowing through the fuel transport gas duct 31 (i.e., fuel transport amount of pulverized coal) are designed to be adjusted, respectively, by adjusting fan rpms of the forced draft fan 47 and primary gas fan 49.

The flue gas cooler 15 is intended to cool the flue gas to a predetermined temperature by exchanging heat between the flue gas flowing through the first flue 9 and a cooling medium (not shown), and is, for example, a tubular heat exchanger adapted to exchange heat between the cooling medium running through a tube and the flue gas flowing outside the tube. The cooling medium used in the flue gas cooler 15 is not particularly limited, and low-pressure feed water of a steam turbine system or sea water may be used as well.

A temperature detector (not shown) adapted to detect temperature of the flue gas introduced into the dust remover 17 is installed in an inlet portion of the dust remover 17 in the first flue 9. Results detected by the temperature detector is designed to be converted into an electrical signal and inputted to a controller (not shown). The controller is designed to control an amount of heat absorbed by the flue gas cooler 15 based on results of comparison between the inputted results and a set temperature. Specifically, at least one of the flow rate and temperature of the cooling medium for the flue gas cooler 15 is designed to be adjusted so as to keep the temperature detected by the temperature detector between 90° C. and 140° C. (both inclusive).

Being supplied with circulating flue gas containing oxygen which is to serve as combustion gas as well as with pulverized coal which is to serve as fuel, the boiler 1 burns the pulverized coal. The flue gas produced as a result of combustion in the boiler 1 is led to the first flue 9 and then supplied to the denitrification device 11, which then removes NOx from the flue gas. After leaving the denitrification device 11, the flue gas is supplied to the combustion gas heater 13 and subjected there to a temperature decrease. After leaving the combustion gas heater 13, the flue gas is supplied to the flue gas cooler 15 where the flue gas has its temperature decreased to a set temperature. Then, the flue gas is led to the dust remover 17, which then removes part of $SO_3$ in the flue gas together with soot components. Subsequently, the flue gas is led to the desulfurizer 21 via the induced draft fan 19 and subjected there to SOx removal. After leaving the desulfurizer 21, the flue gas is cooled and compressed by the flue gas liquefier 23. Then, after $CO_2$ is separated in a liquefied state, the flue gas is released to the atmosphere through the chimney 25.

On the other hand, part of the flue gas passing through the induced draft fan 19 in the first flue 9 is extracted through the flue gas recirculation duct 27 and led to the second flue 29. After being led to the second flue 29, the flue gas is passed through the forced draft fan 47 as recirculating gas and mixed with oxygen injected from the oxygen mixing device 43 to become combustion gas, which is then led to the combustion gas heater 13. After being heated by the combustion gas heater 13, the flue gas is supplied to the combustion gas channel of the burner 5.

Also, the circulating flue gas lead from the flue gas recirculation duct 27 to the second flue 29 and passed through the forced draft fan 47 has its part led to the fuel transport gas duct 31. The circulating flue gas led to the fuel transport gas duct 31 is passed through the primary gas fan 49 and mixed with the oxygen injected from the oxygen mixing device 43 to become fuel carrier gas, which is then led to the combustion gas heater 13. After being heated by the combustion gas heater 13, the fuel carrier gas is supplied to the coal pulverizer 33. Subsequently, the coal crushed by the coal pulverizer 33 is supplied to the fuel channel of the burner 5 through the fuel transport pipe 35 by being accompanied by the fuel carrier gas supplied to the coal pulverizer 33.

High-temperature, high-pressure steam produced as a result of combustion in the boiler 1 is supplied to steam turbine power generator facilities or the like (not shown) and used for power generation.

Incidentally, in an oxygen combustion system, for example, the temperature of the circulating flue gas in the second flue 29 before passing through the combustion gas heater 13 is 70° C. to 100° C., and so the amount of heat exchanged by the combustion gas heater 13 is smaller than when heat is exchanged between room temperature air and the flue gas flowing through the first flue 9. Consequently, the flue gas flowing near the inlet of the dust remover 17 after passing through the combustion gas heater 13 in the first flue 9 has a relatively high temperature (e.g., 190° C. to 200° C.). Such flue gas, when supplied to the dust remover 17, might degrade dust removal efficiency or cause heat damage. Therefore, in order to operate respective devices properly and safely, it is necessary to cool the flue gas circulating in the system to a predetermined temperature. Also, in the oxygen combustion system, since the fuel is burned using high-concentration oxygen and circulating flue gas, major constituents of the flue gas at the boiler outlet are $CO_2$ and $H_2O$ while SOx produced by an S component in the fuel has high concentration. When the temperature of the circulating flue gas and the like containing such high-concentration $H_2O$ and SOx falls, causing $SO_3$ and moisture to form dew, ducts, piping, and equipment become prone to acid dew-point corrosion, and soot particles tend to cause clogging as a result of dew formation.

According to the present embodiment, since the flue gas cooler 15 is installed between the combustion gas heater 13 and dust remover 17 in the first flue 9 to further cool the flue gas after passing through the combustion gas heater 13, efficiency degradation and heat damage of the dust remover 17 can be prevented. Also, since the temperature of the flue gas flowing near the inlet of the dust remover 17 is cooled to or below the acid dew point, the $SO_3$ in the flue gas becomes a sulfuric acid mist, which is then removed by the dust remover 17, being trapped by soot particles in the flue gas.

On the other hand, the flue gas cooled in this way has an acid dew point almost equal to a water dew point. Consequently, if room temperature oxygen is injected, for example, into the second flue 29 or fuel transport gas duct 31, dew may form on surfaces of the oxygen mixing device 43 or an inlet portion of the combustion gas heater 13 due to decreases in the gas temperature. To avoid the dew formation, it is conceivable to reduce moisture concentration by installing a condenser or the like in the flue, but with the oxygen combustion system, in which the moisture concentration in flue gas reaches 25% to 40%, a large heat loss is caused by latent heat treatment, increasing an amount of drain treatment. Besides, the circulating flue gas in the second flue 29 and fuel transport gas duct 31 contains only small amounts of soot particles, making it difficult to remove sulfuric acid mist and thereby creating a danger of acid dew-point corrosion.

Figure 2:
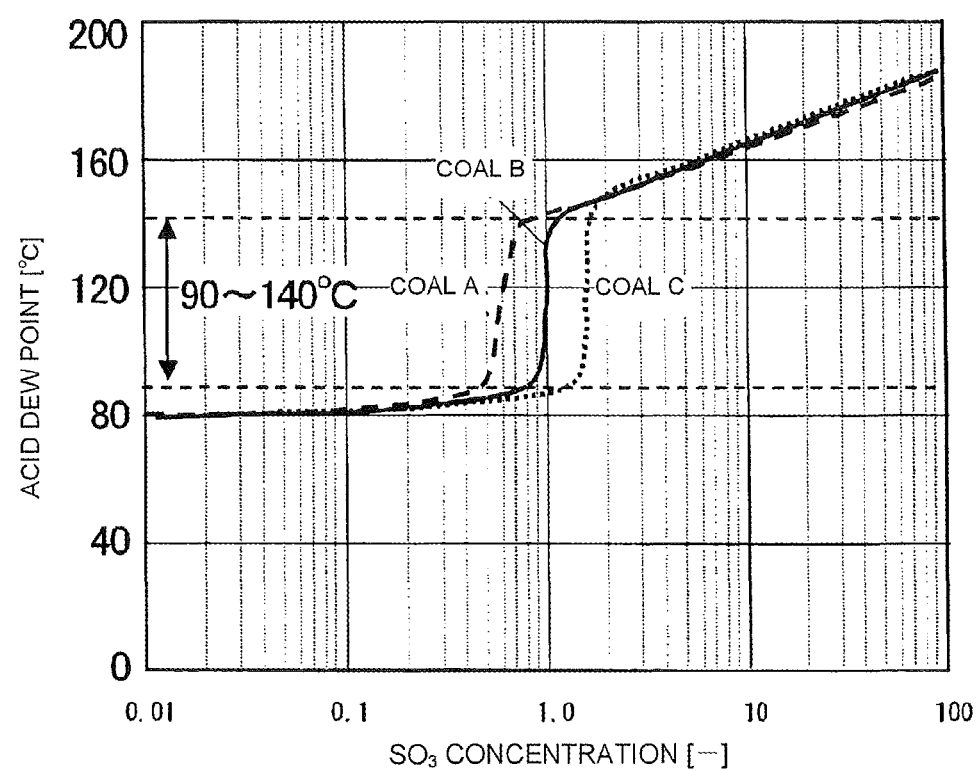
FIG. 2 is a diagram showing a relationship between $SO_3$ concentration and acid dew-point temperature and illustrating an effect of the present invention.

Now, a technique characteristic of the present embodiment will be described. FIG. 2 is a diagram showing a relationship between $SO_3$ concentration in flue gas and acid dew-point temperature, where the abscissa represents the $SO_3$ concentration in flue gas while the ordinate represents the acid dew point (° C.). Incidentally, the abscissa is a logarithmic axis, having made dimensionless based on the $SO_3$ concentration which results when specific coal is burned. The $SO_3$ concentration in the flue gas varies with the content percentage ratio of the S component in raw coal.

As can be seen from FIG. 2, in a specific narrow $SO_3$ concentration range, when the S content ratio in the raw coal is in a range of 0.1% to 2.0% and the moisture concentration in the flue gas is in a range of 25% to 40% (coal A, coal B, coal C), the acid dew-point temperature changes rapidly from approximately 140° C. to approximately 90° C. upon a slight change in the $SO_3$ concentration without being affected by the S content ratio in the raw coal or the moisture concentration in the flue gas. The present invention makes use of this phenomenon to adjust the amount of heat absorbed by the flue gas cooler 15 and keep the flue gas temperature near the inlet of the dust remover 17 between 90° C. and 140° C. (both inclusive), thereby greatly reducing the acid dew point of the flue gas and always keeping the temperatures of the gas flowing through the flue gas recirculation duct 27, second flue 29, fuel transport gas duct 31, and the like to or above the acid dew-point temperature. Here, the rapid fall in the acid dew-point temperature is a phenomenon observed in a predetermined range of $SO_3$ concentrations. Also, the $SO_3$ concentration is affected greatly by the S component and the like contained in the raw coal. Thus, it is necessary to adjust the $SO_3$ concentration by managing the coal type, composition, and the like.

For example, if the amount of heat absorbed by the flue gas cooler 15 is adjusted such that the flue gas temperature on the inlet side of the dust remover 17, i.e., the temperature detected by the temperature detector, will be 140° C., the $SO_3$ in the flue gas is removed by the dust remover 17 together with soot particles. As a result, if the $SO_3$ concentration in the flue gas is reduced by half after passage through the dust remover 17, although the acid dew-point temperature falls, for example, to 90° C. or below, the flue gas temperature remains almost the same as before the passage through the dust remover 17. Since there is no means of heating the flue gas, circulating flue gas, and the like in the flue, duct, and the like following the dust remover 17 except the combustion gas heater 13, it is conceivable that the temperature of the circulating flue gas decreases by 5° C. to 20° C. due to, for example, oxygen injection, heat radiation, and the like, falling to about 120° C. before arrival at the combustion gas heater 13. However, after the passage through the dust remover 17, since the acid dew point of the flue gas has fallen to 90° C. or below, even if the circulating flue gas cools to about 120° C., there is a difference of 30° C. from the acid dew point. Consequently, after the passage through the dust remover 17, the temperatures of the flue gas and circulating flue gas do not fall below the acid dew-point temperature, and thus acid dew-point corrosion and clogging with soot particles can be prevented.

On the other hand, if the flue gas temperature on the inlet side of the dust remover 17 is adjusted to be 160° C., even if the $SO_3$ concentration in the flue gas after passage through the dust remover 17 is reduced to half the level before the passage, the acid dew-point temperature falls only by about a few ° C. to 10° C. from 160° C. Therefore, if the flue gas temperature falls by about 5° C. to 20° C. due to heat radiation and the like after passage through the dust remover 17 until the flue gas reaches the combustion gas heater 13, the flue gas temperature can fall below the acid dew-point temperature, causing acid dew-point corrosion in the flue, duct, or the like.

Also, if the flue gas temperature on the inlet side of the dust remover 17 is adjusted to be 80° C., even if the $SO_3$ concentration in the flue gas after passage through the dust remover 17 is reduced to half the level before the passage, the acid dew-point temperature falls only by about a few ° C. to 10° C. from 80° C. Therefore, if the flue gas temperature falls by about 5° C. to 20° C. due to heat radiation and the like after passage through the dust remover 17 until the flue gas reaches the combustion gas heater 13, the flue gas temperature can fall below the acid dew-point temperature, causing acid dew-point corrosion in the flue, duct, or the like.

According to the present embodiment, since the flue gas temperature near the inlet of the dust remover 17 is kept between 90° C. and 140° C. (both inclusive), the acid dew-point temperature can be decreased greatly by slightly reducing the $SO_3$ concentration. Consequently, even if the flue gas is circulated without removing moisture from the flue gas, acid dew-point corrosion and clogging with soot particles can be prevented in the flue gas recirculation duct 27, the second flue 29, fuel transport gas duct 31, and the like, improving reliability and safety of the plant.

Incidentally, with the oxygen combustion system, in which the flue gas contains a high concentration of moisture, from the perspective of preventing moisture condensation, it is preferable to install known means of maintaining warmth such as a heater in the duct, flue, and the like following the dust remover 17 to prevent temperature decreases of the circulating flue gas after leaving the dust remover 17.

Incidentally, with the oxygen combustion system, the composition, flow rate, and heat content of the gas flowing through the system vary greatly between air combustion operation on start-up and oxygen combustion operation in steady state. Also, the temperature of the flue gas emitted from the combustion gas heater 13 in the first flue 9 varies greatly with operating conditions. Therefore, it is difficult to constantly manage the flue gas temperature near the inlet of the dust remover 17 using the combustion gas heater 13 alone. In this regard, according to the present embodiment, a tubular heat exchanger is used as the flue gas cooler 15 and placed independently on the downstream side of the combustion gas heater 13 in the first flue 9. Consequently, the flue gas temperature on the inlet side of the dust remover 17 can always be adjusted quickly to any temperature and maintained stably at the set temperature, independently of the operating conditions of the oxygen combustion system without being affected by the flow rates and temperatures of the flue gas and circulating flue gas, oxygen supply amount and temperature, and the like.

Also, during oxygen combustion operation, the amount of heat absorbed by the flue gas cooler 15 may be adjusted according to the load on the boiler 1 while keeping the flue gas temperature on the inlet side of the dust remover 17 in the range of 90° C. to 140° C. (both inclusive). For example, when the boiler 1 is operating at rated load, the amount of heat absorbed by the flue gas cooler 15 can be controlled such that the flue gas temperature will always be constant (e.g., 120° C.), and under low loads, the amount of heat absorbed by the flue gas cooler 15 can be controlled such that the flue gas temperature will be equal to or lower (e.g., 100° C.) or higher than the flue gas temperature under rated-load conditions.

According to the present embodiment, since heat is exchanged with the flue gas by the combustion gas heater 13 after oxygen lower in temperature (e.g., room temperature) than the circulating flue gas is mixed in the circulating flue gas in the second flue 29 and fuel transport gas duct 31, heat is recovered by the oxygen in the combustion gas heater 13. This makes it possible to increase an amount of boiler heat input and improve plant efficiency. Also, since the amount of heat absorbed by the flue gas cooler 15 can be smaller than when oxygen is mixed in the circulating flue gas on the downstream side of the combustion gas heater 13, the flue gas cooler 15 itself can be made compact, the cost of expanding or remodeling existing facilities can be curbed, and reductions in the efficiency of the entire plant system caused by cooling can be minimized.

Second Embodiment

A second embodiment of an oxygen combustion system resulting from application of the present invention will be described below with reference to FIG. 3. Incidentally, in the present embodiment, differences from the first embodiment will be described, wherein the same components as those in the first embodiment are denoted by the same reference numerals as the corresponding components in the first embodiment, and description thereof will be omitted.

The present embodiment differs in configuration from the first embodiment in that an oxygen mixing device 51 is installed in the flue gas recirculation duct 27 instead of the oxygen mixing device 43 in FIG. 1. According to the present embodiment, since the high-concentration oxygen produced by the air separator 41 is mixed with part of the flue gas extracted from the first flue 9 and then distributed to the second flue 29 and fuel transport gas duct 31, the combustion gas flowing through the second flue 29 and the fuel carrier gas flowing through the fuel transport gas duct 31 are equal in oxygen concentration. The present embodiment has the advantage of being able to easily adjust the oxygen concentration of the combustion gas and fuel carrier gas using simple facilities when it is all right if the combustion gas and fuel carrier gas are equal in oxygen concentration.

Third Embodiment

Figure 4:
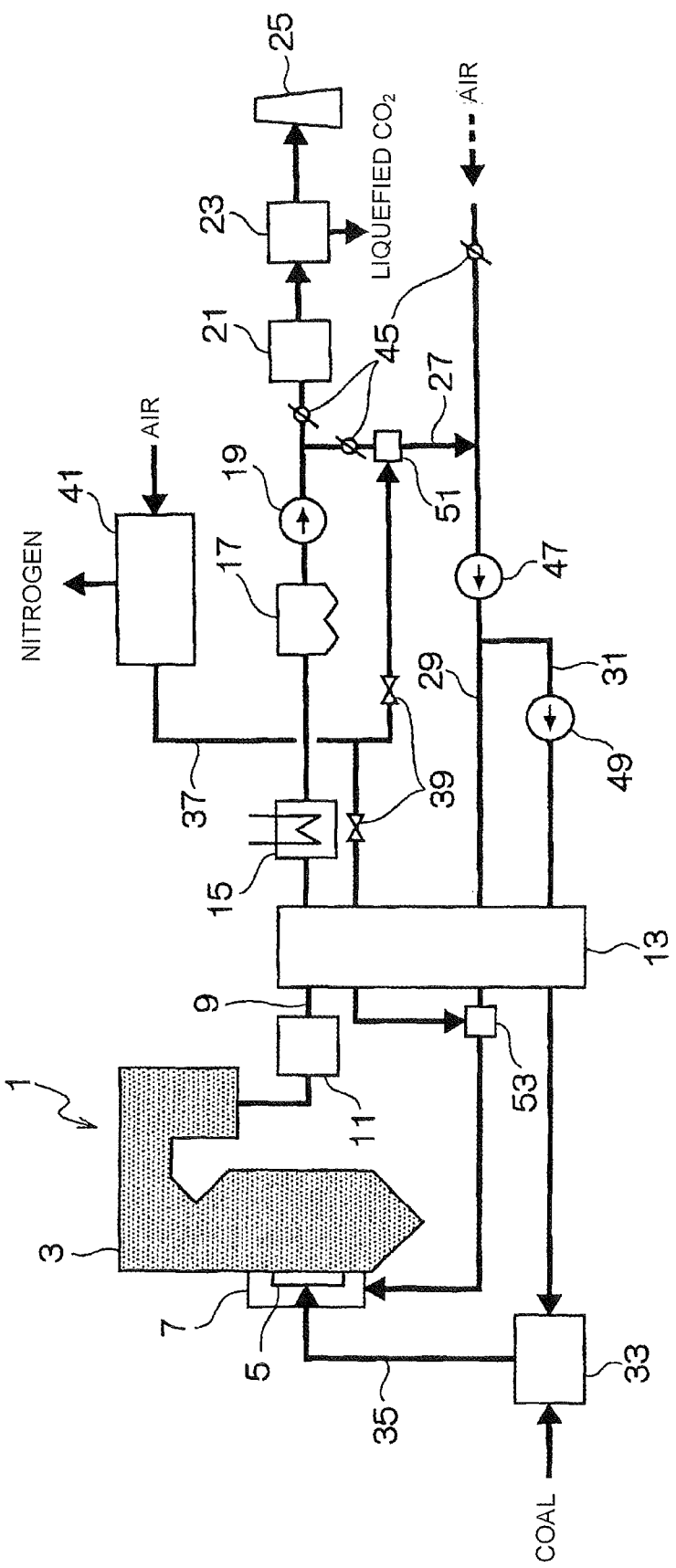
FIG. 4 is a system diagram showing a configuration of a third embodiment of an oxygen combustion system resulting from application of the present invention.

A third embodiment of an oxygen combustion system resulting from application of the present invention will be described below with reference to FIG. 4. Incidentally, in the present embodiment, differences from the second embodiment will be described, wherein the same components as those in the second embodiment are denoted by the same reference numerals as the corresponding components in the second embodiment, and description thereof will be omitted.

Figure 3:
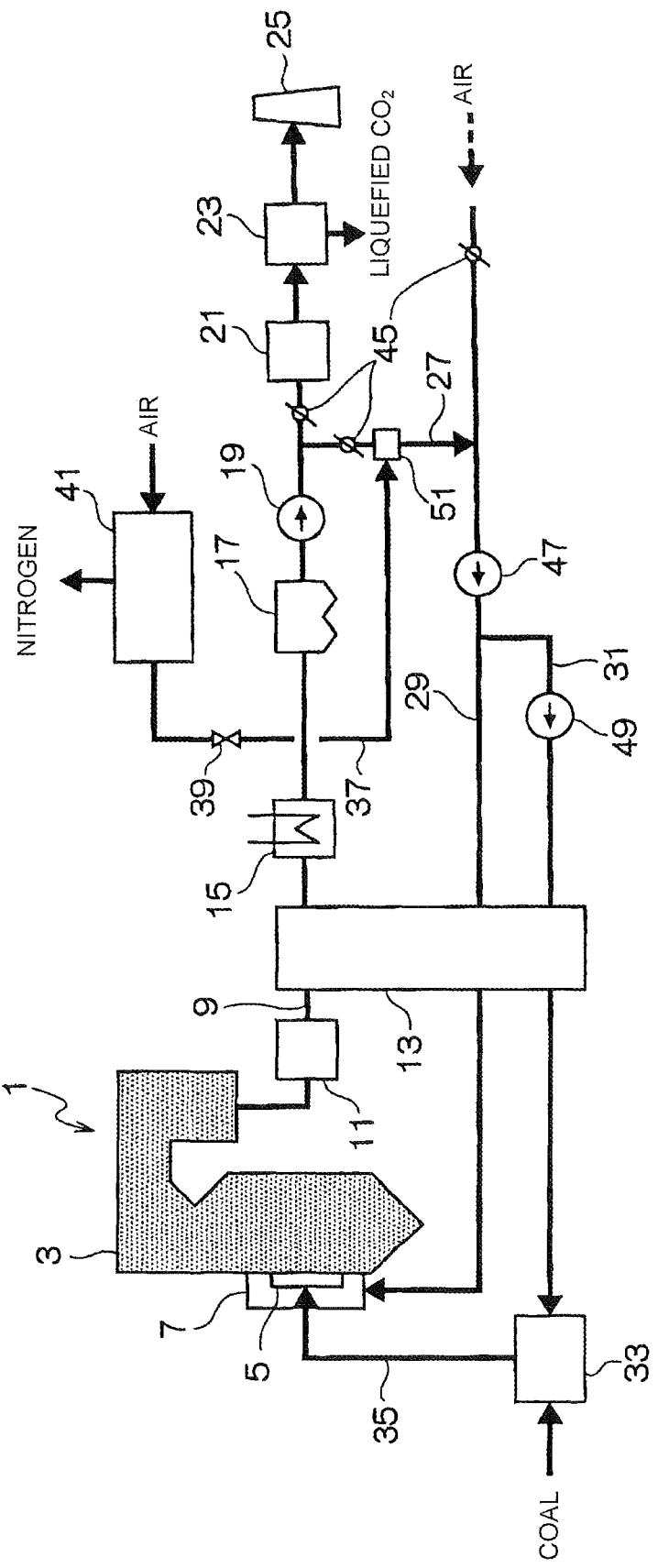
FIG. 3 is a system diagram showing a configuration of a second embodiment of an oxygen combustion system resulting from application of the present invention.

The present embodiment differs in configuration from the second embodiment in that an oxygen mixing device 53 is installed in the second flue 29 on the downstream side of the combustion gas heater 13 in addition to the oxygen mixing device 51 in FIG. 3. The present embodiment has the advantage of being able to easily adjust the oxygen concentrations of the combustion gas and fuel carrier gas although heat recovery efficiency of the combustion gas heater 13 is slightly lower than in the second embodiment because most of the oxygen produced by the air separator 41 is supplied to that part of the second flue 29 which is located on the upstream side of the combustion gas heater 13 and the remaining small amount of oxygen is supplied to the part located on the downstream side of the combustion gas heater 13.

Fourth Embodiment

Figure 5:
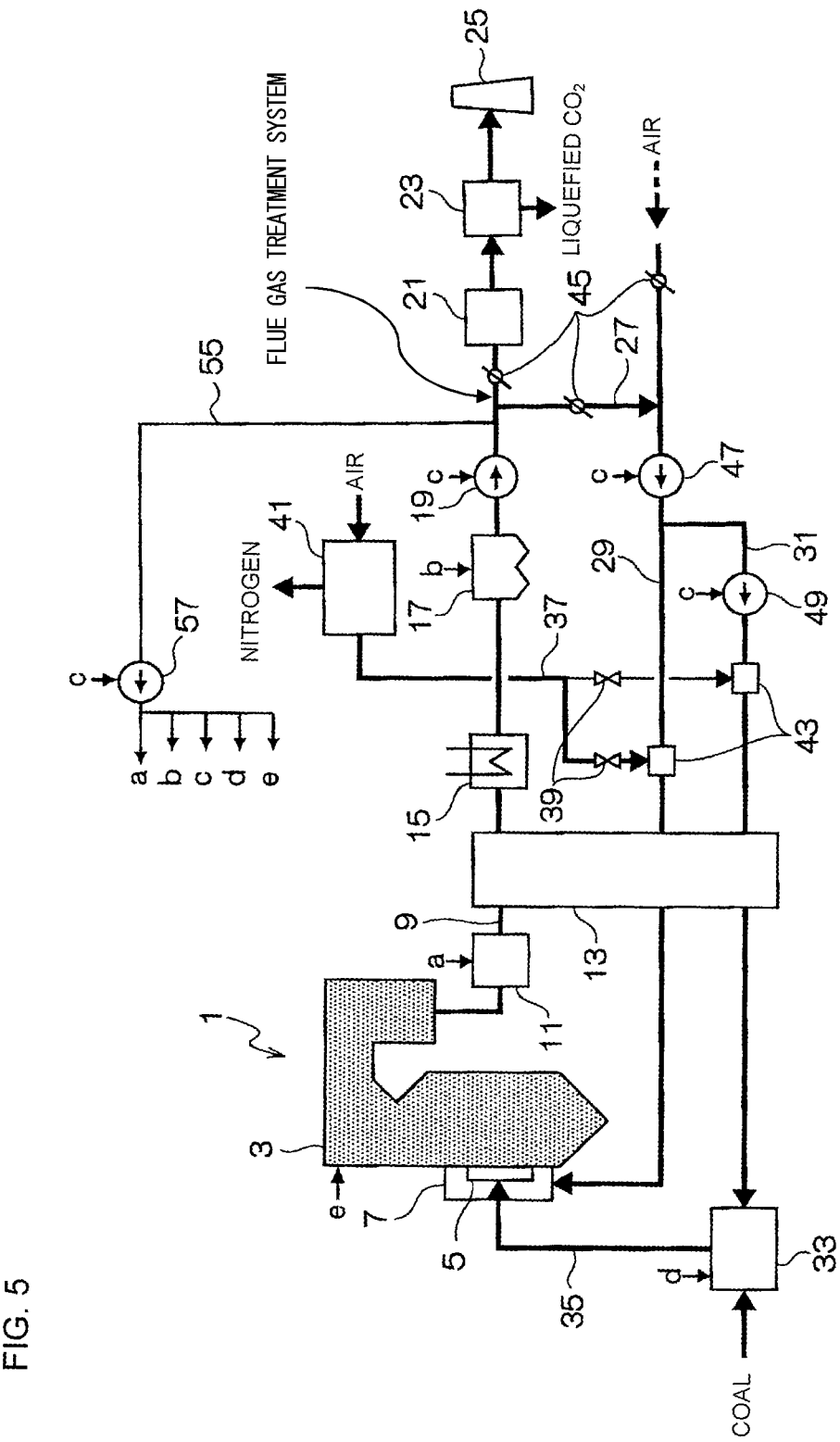
FIG. 5 is a system diagram showing a configuration of a fourth embodiment of an oxygen combustion system resulting from application of the present invention.

A fourth embodiment of an oxygen combustion system resulting from application of the present invention will be described below with reference to FIG. 5. Incidentally, in the present embodiment, differences from the first embodiment will be described, wherein the same components as those in the first embodiment are denoted by the same reference numerals as the corresponding components in the first embodiment, and description thereof will be omitted.

The present embodiment differs in configuration from the first embodiment in that a working gas supply device is installed to supply flue gas as working gas to a predetermined ancillary facility by extracting the flue gas from the downstream side of the dust remover 17 in the first flue 9. The working gas supply device includes a working gas supply pipe 55 connected between the dust remover 17 and desulfurizer 21 of the first flue 9, and a supply ventilator 57 disposed on the working gas supply pipe 55.

The working gas supply device is designed to extract part of the flue gas flowing through the first flue 9, by driving the supply ventilator 57, and supply the extracted flue gas to an ancillary facility of at least one of the boiler 1 and flue gas treatment system through the working gas supply pipe 55, where the flue gas treatment system is adapted to purify the flue gas discharged from the boiler 1. Specifically, examples of the ancillary facility to which the flue gas is supplied include an ancillary facility of the denitrification device 11, namely, a reducing agent injection line a for diluting the reducing agent; an ancillary facility of the dust remover 17, namely, an aeration working gas line b (for aeration gas) used by the dust remover 17 to sweep off soot particles; an axial-sealing working gas line c for the forced draft fan 47 and primary gas fan 49; a sealing gas line d for a sliding portion of the coal pulverizer 33; and a sealing gas line e for sliding portions of a soot blower for a water-cooled wall (wall blower) and soot blower for heat exchanger tubes (soot blower) of the boiler 1.

According to the present embodiment, since the flue gas discharged from the boiler 1 and having a high concentration of $CO_2$ can be used as working gas to be supplied to various ancillary facilities during oxygen combustion instead of air, even if the working gas leaks or intrudes into the boiler 1, for example, from a seal of the sliding portion of the coal pulverizer 33, the boiler 1 can be operated without decreasing the $CO_2$ concentration in the flue gas. Consequently, the $CO_2$ separation and recovery efficiency of the flue gas liquefier 23 can be kept at a high level and increases in compressor power needed to compress the flue gas can be curbed. Also, since the present embodiment uses the flue gas extracted from the downstream side of the dust remover 17, the present embodiment can prevent the working gas supply pipe 55 and the like from being clogged by soot particles. On the other hand, when the flue gas is used as working gas, acid dew-point corrosion of operating equipment due to the $SO_3$ contained in the flue gas is feared. However, since the $SO_3$ concentration of the flue gas on the downstream side of the dust remover 17 is reduced, acid dew-point corrosion of operating equipment can be inhibited.

Fifth Embodiment

Figure 6:
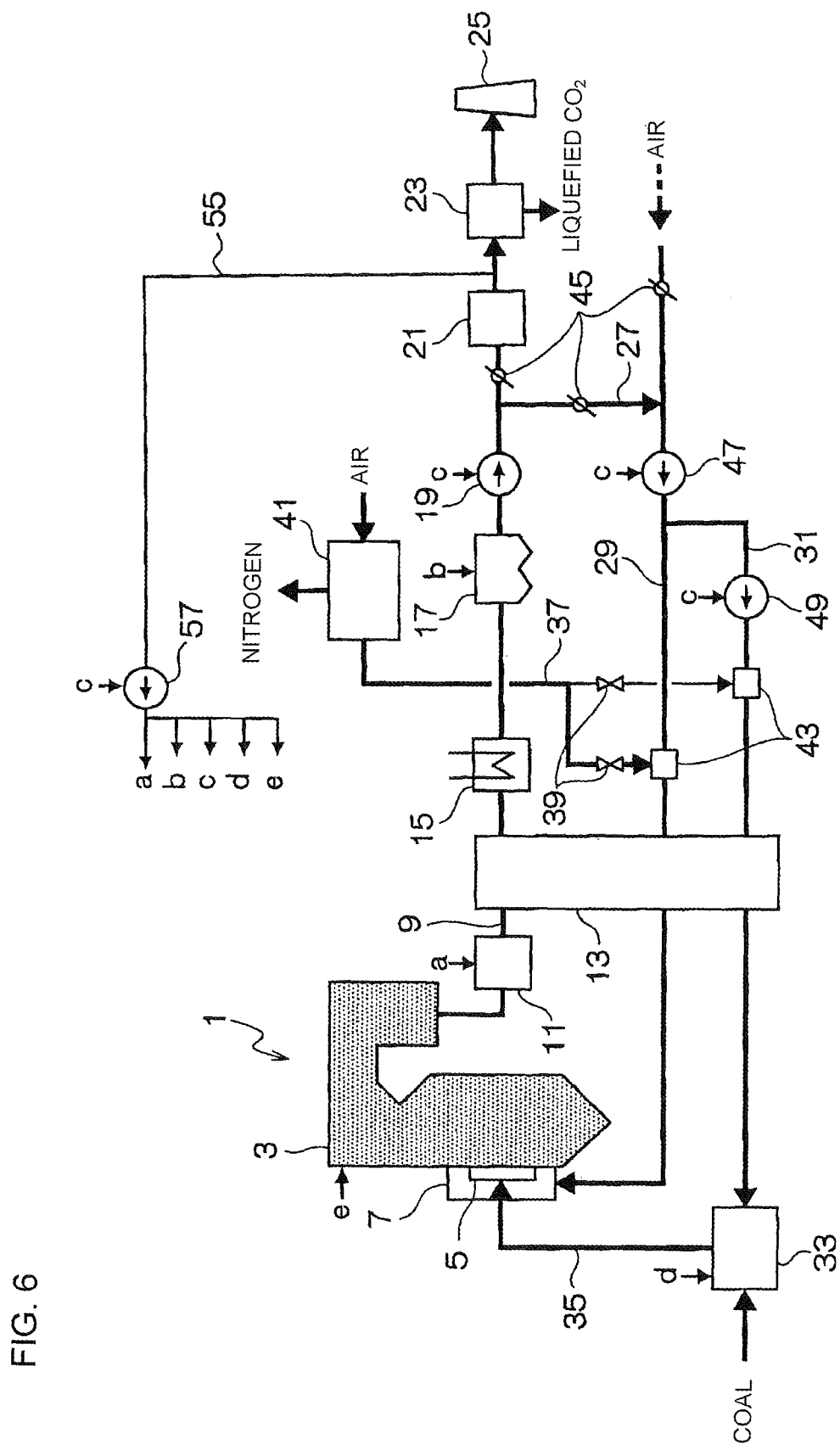
FIG. 6 is a system diagram showing a configuration of a fifth embodiment of an oxygen combustion system resulting from application of the present invention.

A fifth embodiment of an oxygen combustion system resulting from application of the present invention will be described below with reference to FIG. 6. Incidentally, in the present embodiment, differences from the fourth embodiment will be described, wherein the same components as those in the fourth embodiment are denoted by the same reference numerals as the corresponding components in the fourth embodiment, and description thereof will be omitted.

The present embodiment differs in configuration from the fourth embodiment in that the working gas supply pipe 55 is connected to the downstream side of the desulfurizer 21 in the first flue 9. During oxygen combustion, since the flue gas has a far lower concentration of $SO_3$ after passage through the desulfurizer 21 than before the passage through the desulfurizer 21, the use of the flue gas as the working gas offers the effect of being able to prevent acid dew-point corrosion of the operating equipment more reliably, in addition to the effects of the fourth embodiment. Incidentally, a similar effect is available when $CO_2$ gas produced by vaporizing liquid $CO_2$ using a vaporizer is used as the working gas, where the liquid $CO_2$ may be $CO_2$ liquefied by the flue gas liquefier 23 or liquefied $CO_2$ taken out of a tank storing liquefied $CO_2$.

Sixth Embodiment

A sixth embodiment of an oxygen combustion system resulting from application of the present invention will be described below with reference to FIGS. 7 and 8. Incidentally, in the present embodiment, differences from the first embodiment will be described, wherein the same components as those in the first embodiment are denoted by the same reference numerals as the corresponding components in the first embodiment, and description thereof will be omitted.

Figure 7:
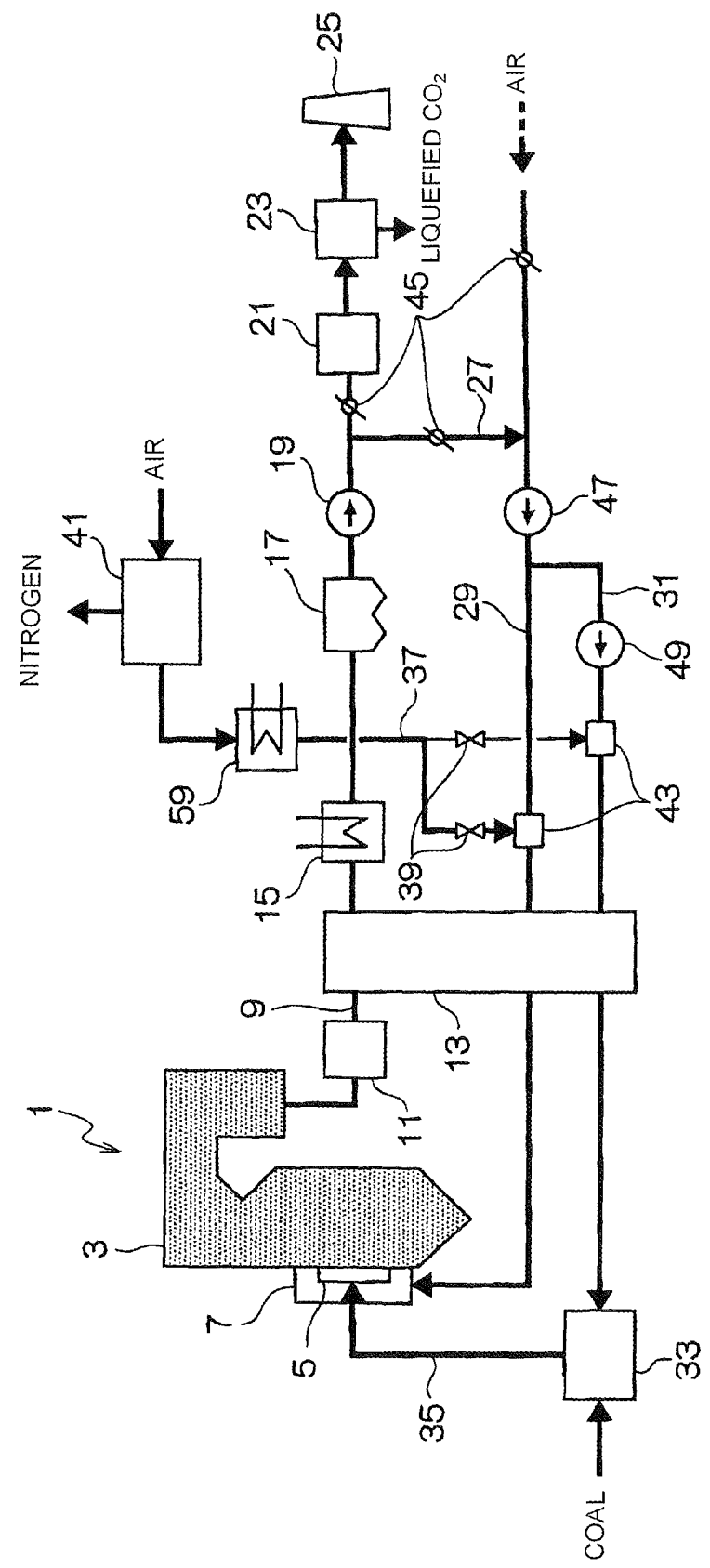
FIG. 7 is a system diagram showing a configuration of a sixth embodiment of an oxygen combustion system resulting from application of the present invention.
Figure 8:
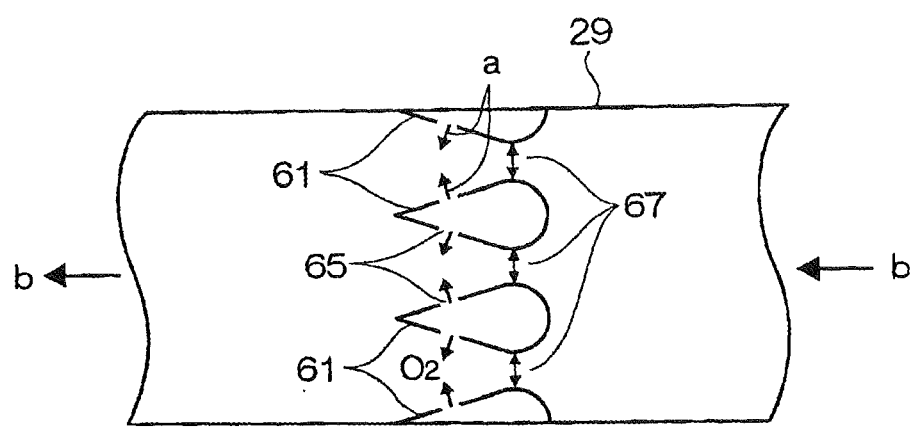
FIGS. 8(a) and 8(b) are diagrams illustrating a configuration of an oxygen mixer in an oxygen combustion system resulting from application of the present invention, where
Figure 8:
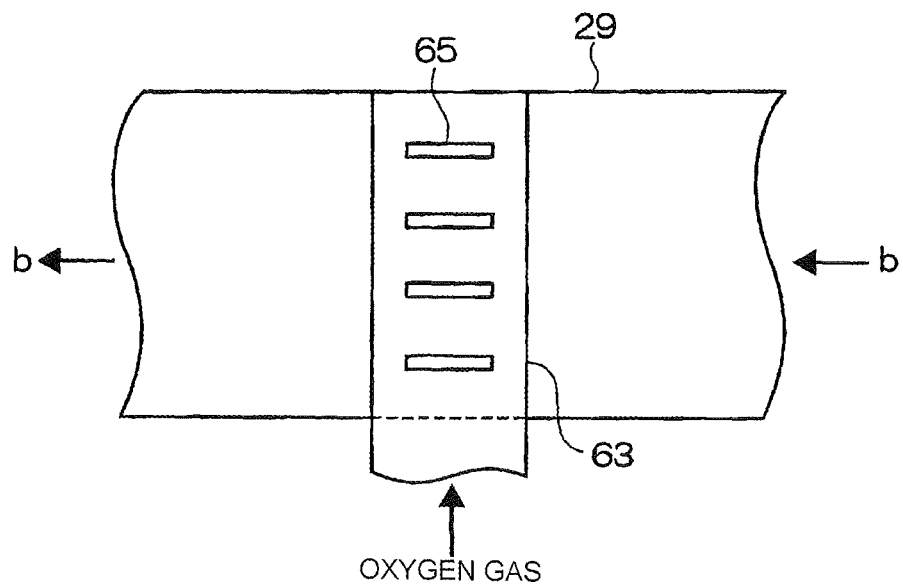

The present embodiment differs in configuration from the first embodiment in that an oxygen pre-heater 59 is installed in some midpoint in the oxygen introduction pipe 37 as shown in FIG. 7, to heat the oxygen passing through the oxygen pre-heater 59 via heat exchange with a heat medium. The heat medium of the oxygen pre-heater 59 is not particularly limited, and bleed or flue gas from a steam turbine system, for example, may be used as well.

The installation of the oxygen pre-heater 59 on the oxygen introduction pipe 37 makes it possible to supply room temperature oxygen produced by the air separator 41 by keeping the oxygen at a temperature equal to or higher than the acid dew-point temperature of the circulating flue gas, i.e., for example, by pre-heating the oxygen to a temperature approximately to that of the circulating flue gas to be mixed with. Oxygen can be heated to about 300° C. if heat-exchanged with high-temperature flue gas (e.g., 200° C. to 300° C.), but if the oxygen is heated to too high temperatures, component materials coming into contact with the high-concentration oxygen might get oxidized, accelerating corrosion. Thus, it is sufficient to raise the temperature of the oxygen to a level approximately equal to that of the circulating flue gas (e.g., 90° C. to 140° C.).

As oxygen is pre-heated in this way, when the oxygen is injected, for example, the temperature of a contact surface between an oxygen blast nozzle of the oxygen mixing device 43 and the circulating flue gas as well as the temperature after mixing are kept at or above the water dew point and acid dew-point. Therefore, even if the circulating flue gas is recirculated without removing moisture, it is possible to inhibit dew-point corrosion, and clogging with ash, of a heat exchanger element and the like of the combustion gas heater 13. Incidentally, to prevent temperature decreases of the circulating flue gas, it is useful to thermally insulate the second flue 29 and fuel transport gas duct 31 as well.

Incidentally, the oxygen supplied to the second flue 29 is high-concentration gas with a concentration of 95% vd or more. Consequently, if the supplied oxygen and the circulating flue gas are mixed improperly, a zone with a high oxygen concentration will be formed locally in the flue. Then, when such high-concentration oxygen flows into the combustion gas heater 13, any unburnt ash sticking to the heat exchanger element could be burned by a combustion-supporting effect of the high-concentration oxygen, resulting in a heat damage.

Now, a configuration of the oxygen mixing device 43 according to the present embodiment will be described. As shown in FIG. 8, the oxygen mixing device 43 according to the present embodiment includes plural slit-shaped nozzle holes formed in a planar direction orthogonal to a direction of gas flow in the second flue 29. The nozzle holes are constructed using a gas mixing foil 63 in which plural throttling structures 61 with a streamlined, airfoil-shaped cross section are arranged at equal intervals. As shown in FIG. 8(b), oxygen is introduced from a body direction of the gas mixing foil 63. As shown in FIG. 8(a), oxygen a ejected through the nozzle holes 65 formed between respective pairs of throttling structures 61 collides with circulating flue gas b accelerated after entering throttles 67 and is mixed with the circulating flue gas b. Incidentally, the oxygen mixing device 43 installed in the fuel transport gas duct 31 has a similar configuration.

With this configuration, when oxygen is supplied through the oxygen mixing device 43, oxygen concentration distribution is made uniform quickly throughout a duct cross section, reducing a peak oxygen concentration. Consequently, high-concentration oxygen does not reach the combustion gas heater 13. This makes it possible to inhibit the combustion-supporting effect and thereby avoid heat damage of the heat exchanger element of the combustion gas heater 13.

If, for example, a ratio L/D between linear distance L from an oxygen injection point to an inlet of the combustion gas heater 13 and a representative duct (flow channel) dimension D can be maintained at 20 or above, the oxygen concentration can also be made uniform even by such injection means as placing plural oxygen blast nozzles in the duct cross section. However, in actual plants, preferably duct length is short to prevent decreases in the temperature of the circulating flue gas. Besides, even in already-existing plants, L/D of only about 5 to 10 can be secured in some cases. In such cases, as with the oxygen mixing device 43 according to the present embodiment, adoption of the gas mixing foil 63 makes it possible to keep down deviations of oxygen concentration in the duct cross section to about ±20%.

According to the present embodiment, since the oxygen pre-heater 59 is installed on the oxygen introduction pipe 37, oxygen can be mixed with the circulating flue gas after being heated to a predetermined temperature, making it possible to curb decreases in the temperature of the circulating flue gas and thereby prevent clogging and acid dew-point corrosion of the combustion gas heater 13. Also, the use of the gas mixing foil 63 for the oxygen mixing device 43 allows the oxygen and circulating flue gas to be mixed uniformly and quickly, making it possible to prevent heat damage of the combustion gas heater 13 and improve the safety and reliability of the plant.

Seventh Embodiment

A seventh embodiment of an oxygen combustion system resulting from application of the present invention will be described below with reference to FIG. 9. Incidentally, in the present embodiment, differences from the sixth embodiment will be described, wherein the same components as those in the sixth embodiment are denoted by the same reference numerals as the corresponding components in the sixth embodiment, and description thereof will be omitted.

Whereas an example in which the oxygen pre-heater 59 is disposed on the oxygen introduction pipe 37 as a means of heating the high-concentration oxygen produced by the air separator 41 has been described in FIG. 7, the present embodiment differs in configuration from the sixth embodiment in that an oxygen pre-heater 69 is disposed between the flue gas cooler 15 and dust remover 17 in the first flue 9 to use the flue gas which has passed through the flue gas cooler 15 in the first flue 9 as a heat source. A tubular heat exchanger or the like is used as the oxygen pre-heater 69, for example, to exchange heat between oxygen running through a tube and the flue gas flowing outside the tube.

The flue gas temperature around the inlet of the dust remover 17 is adjusted, according to the amount of heat absorbed by the flue gas cooler 15, so as to be between 90° C. and 140° C. (both inclusive), while the flue gas temperature around the outlet of the flue gas cooler 15 is adjusted to be approximately 10° C. higher than when the oxygen pre-heater 69 is not installed, by taking heat recovery by the oxygen pre-heater 69 into consideration. By heating oxygen by the oxygen pre-heater 69, it is possible to reduce the amount of heat absorbed by the flue gas cooler 15.

High-concentration oxygen, when heated by high-temperature flue gas, causes acid corrosion of constituent material of the oxygen introduction pipe 37 to proceed, but the installation of the oxygen pre-heater 69 adapted to exchange heat between flue gas and oxygen makes it possible to inhibit acid corrosion, where the flue gas flows through the flue between the flue gas cooler 15 and the dust remover 17 and has a relatively low temperature, for example, approximately equal to heating temperature of the oxygen.

Eighth Embodiment

Figure 10:
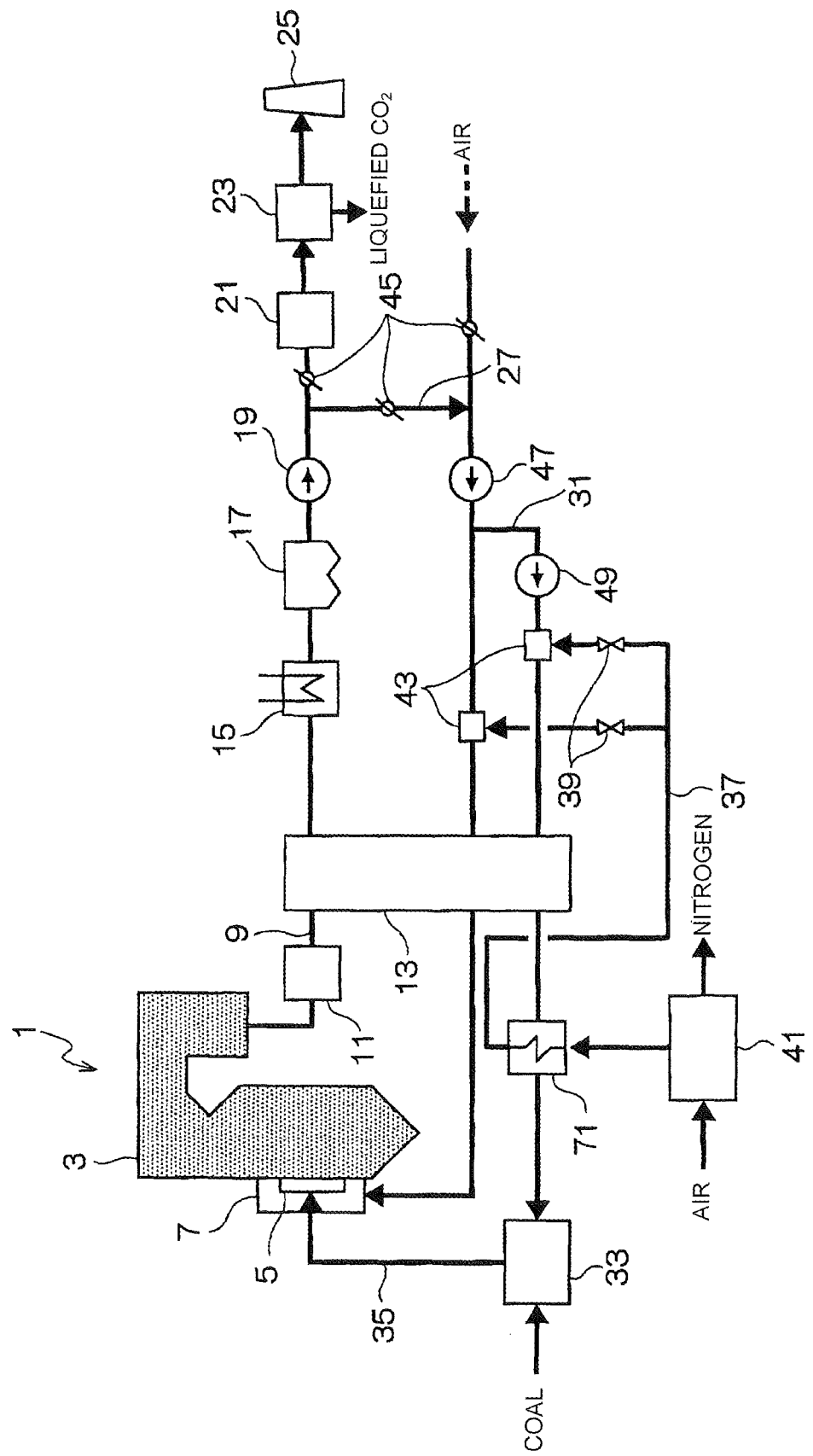
FIG. 10 is a system diagram showing a configuration of an eighth embodiment of an oxygen combustion system resulting from application of the present invention.

An eighth embodiment of an oxygen combustion system resulting from application of the present invention will be described below with reference to FIG. 10. Incidentally, in the present embodiment, differences from the seventh embodiment will be described, wherein the same components as those in the seventh embodiment are denoted by the same reference numerals as the corresponding components in the seventh embodiment, and description thereof will be omitted.

Figure 9:
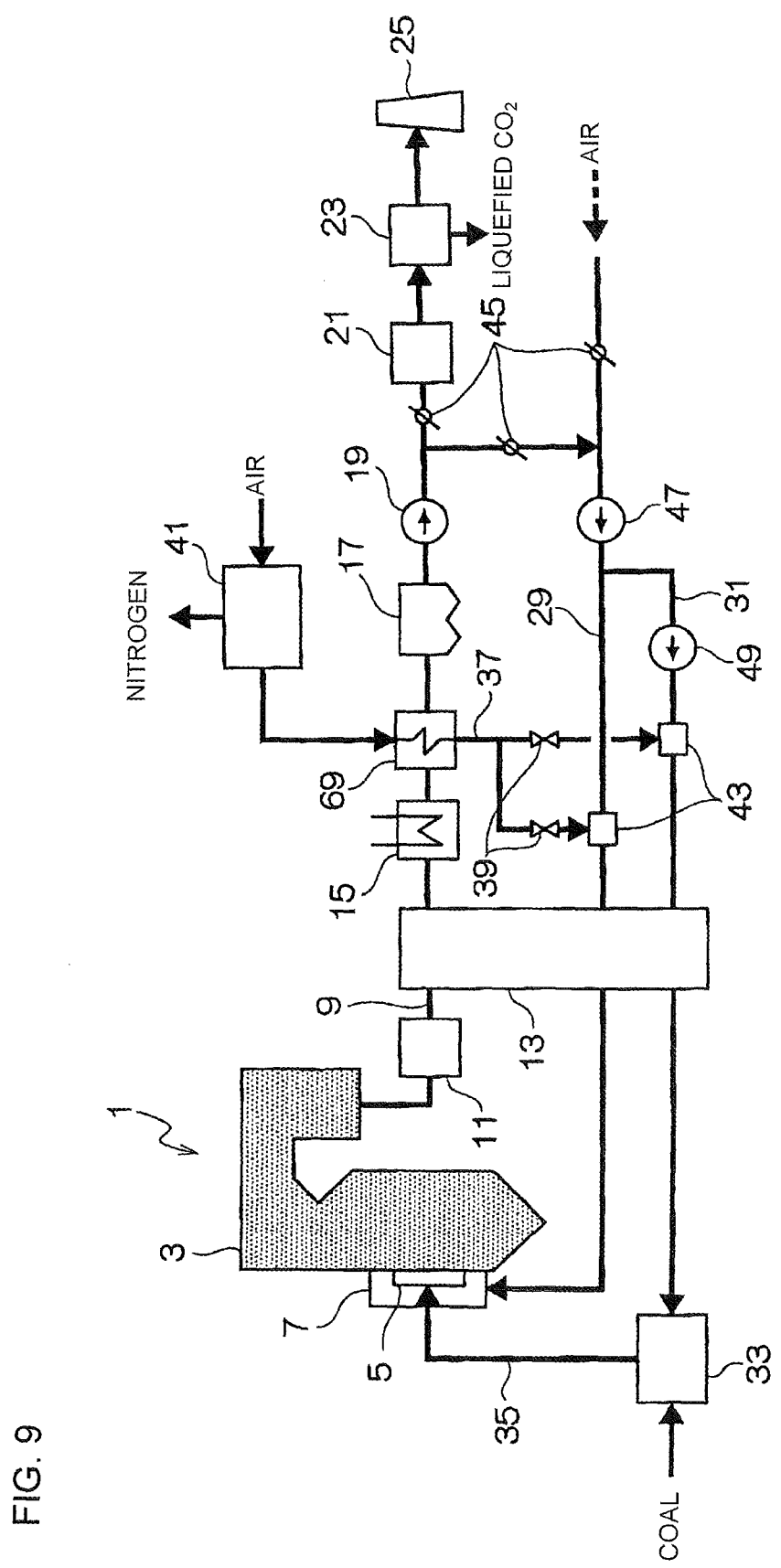
FIG. 9 is a system diagram showing a configuration of a seventh embodiment of an oxygen combustion system resulting from application of the present invention.

Whereas an example in which the oxygen pre-heater 69 is disposed between the flue gas cooler 15 and dust remover 17 in the first flue 9 as a means of heating the high-concentration oxygen has been described in FIG. 9, the present embodiment differs in configuration from the seventh embodiment in that an oxygen pre-heater 71 is disposed on the fuel transport gas duct 31 on the downstream side of the combustion gas heater 13 so as to use the circulating flue gas heated by the combustion gas heater 13, i.e., pulverized coal carrier gas, as a heat source. A tubular heat exchanger is used as the oxygen pre-heater 71, for example, to exchange heat between oxygen running through a tube and the circulating flue gas flowing outside the tube.

According to the present embodiment, as with the seventh embodiment, since oxygen can be heated using the circulating flue gas as a heat source, acid corrosion of the oxygen introduction pipe 37 can be inhibited. Also, since the oxygen combines a cooling medium of the circulating flue gas heated by the combustion gas heater 13, the circulating flue gas supplied to the coal pulverizer 33 can be adjusted to a set temperature. This makes it possible to increase system efficiency.

Ninth Embodiment

A ninth embodiment of an oxygen combustion system resulting from application of the present invention will be described below with reference to the drawings. Incidentally, in the present embodiment, differences from the first embodiment will be described, wherein the same components as those in the first embodiment are denoted by the same reference numerals as the corresponding components in the first embodiment, and description thereof will be omitted.

Figure 11:
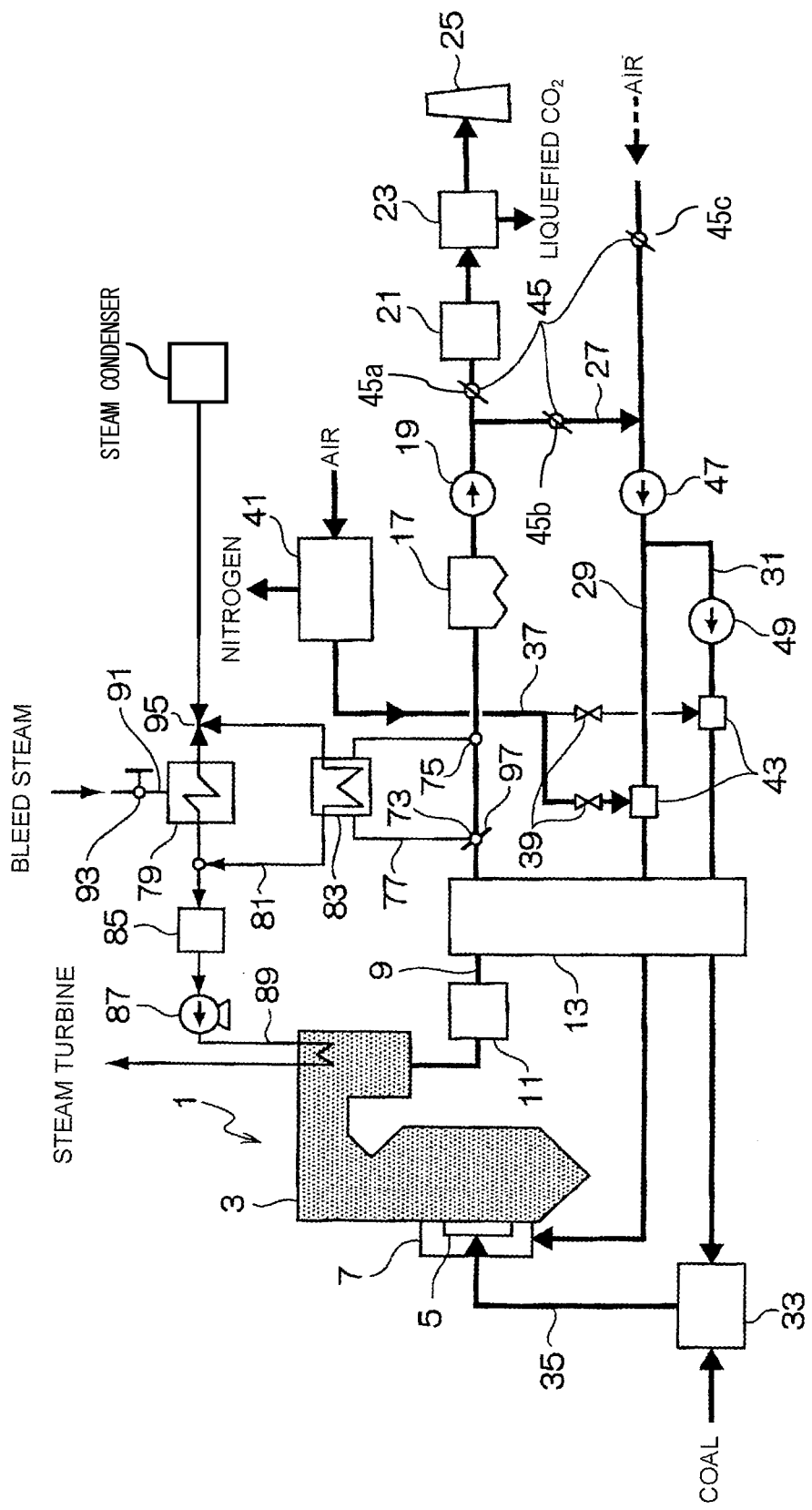
FIG. 11 is a system diagram showing a configuration of a ninth embodiment of an oxygen combustion system resulting from application of the present invention.

As shown in FIG. 11, the present embodiment differs in configuration from the first embodiment in that the present embodiment includes a flue gas bypass conduit 77 adapted to bypass a flow channel linking an output port 73 with a return port 75 on the downstream side of the output port 73, the output port 73 being disposed between the combustion gas heater 13 and dust remover 17 in the first flue 9; a condensate heater 79 adapted to heat steam condensate by exchanging heat with bleed steam, the steam condensate having been discharged from a steam turbine (not shown) and condensed by a steam condenser (not shown) of a steam system of the boiler 1; and a condensate bypass conduit 81 adapted to bypass the condensate heater 79 and that the flue gas cooler 15 in FIG. 1 is configured to be a flue gas cooler 83 adapted to exchange heat between the flue gas running through the flue gas bypass conduit 77 and the steam condensate running through the condensate bypass conduit 81. The flue gas cooler 83 is a tubular heat exchanger which includes a heat exchanger tube installed in a container and communicated at both ends with the condensate bypass conduit 81 and exchanges heat between the steam condensate running through the heat exchanger tube and the flue gas flowing outside the tube.

The steam system of the boiler 1 includes the condensate heater 79, a deaerator 85, and a feed water pump 87. The steam condensate heated by the condensate heater 79 through heat exchange with bleed steam is designed to be deaerated by the deaerator 85, then led to a heat exchanger tube 89 in the boiler 1 via the feed water pump 87, and supplied as superheated steam to the turbine (not shown). The bleed steam is designed to be introduced into the condensate heater 79 via a bleed introduction conduit 91 to allow the steam condensate flowing through the tube to exchange heat with the bleed steam flowing outside the tube. A bleed valve 93 adapted to adjust an amount of bleed steam supply is disposed in the bleed introduction conduit 91.

A switching valve 95 serving as a second valve unit is installed on a conduit on a condensate inlet side of the condensate heater 79. The switching valve 95 is connected with one end of the condensate bypass conduit 81 and a conduit on an outlet side of the condensate heater 79 is connected with the other end of the condensate bypass conduit 81. FIG. 11 shows an example in which only one condensate heater 79 is installed for ease of explanation, but it is generally the case that plural condensate heaters 79 are installed according to the temperature, pressure, and the like of bleed steam. The condensate bypass conduit 81 is configured such that steam condensate bypassing at least one condensate heater 79 will be returned to piping on the downstream side of one or more condensate heaters 79.

A damper 97 serving as a third valve unit is installed at the output port 73 of the first flue 9. On instructions from a controller (not shown), the valve opening of the bleed valve 93 is adjusted and the switching valve 95 and the damper 97 switch flow channels of steam condensate and flue gas, respectively.

Figure 12:
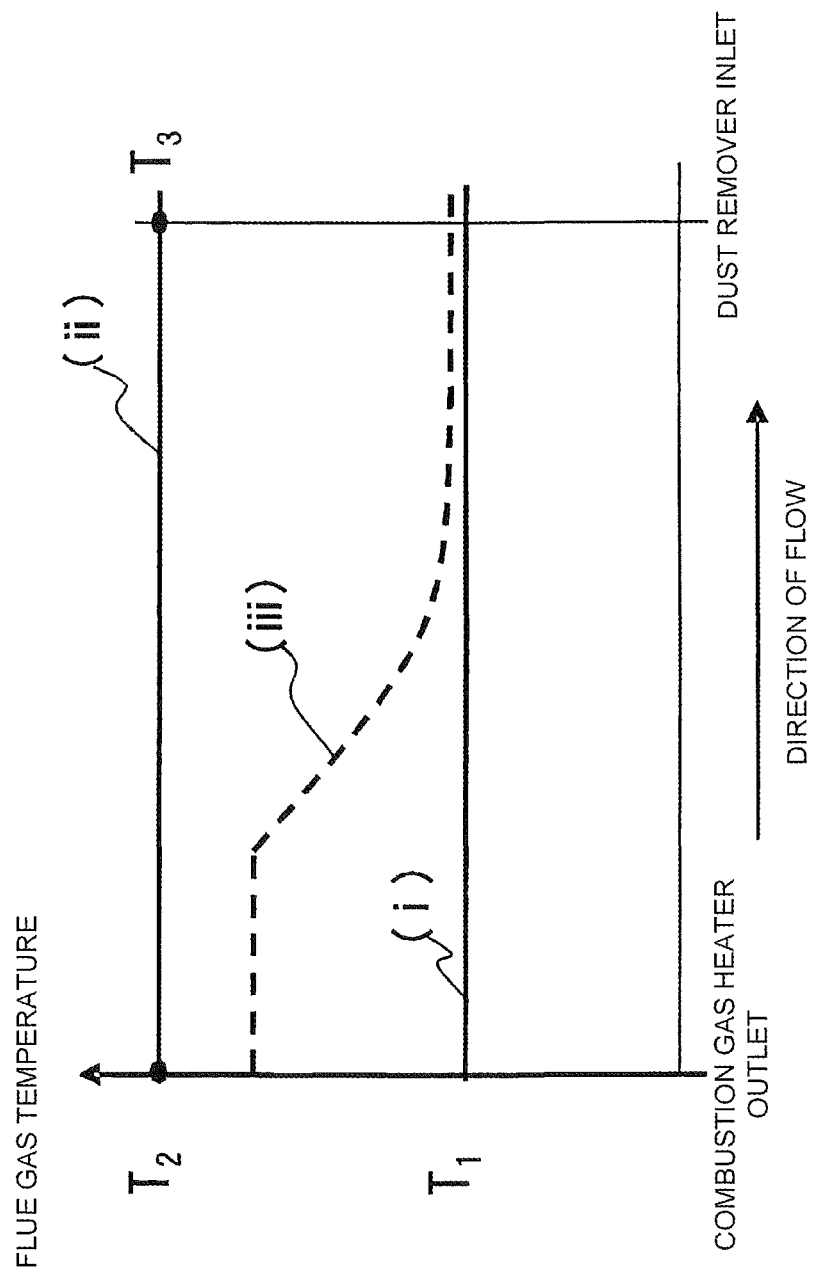
FIG. 12 shows temperature changes along a direction of flow until flue gas is introduced into a dust remover after passing through a combustion gas heater, where (i) shows flue gas temperature during air combustion and (ii) shows flue gas temperature during oxygen combustion.

Now, principles of the flue gas cooler 83 according to the present embodiment will be described. FIG. 12 shows temperature changes along a direction of flow until flue gas is introduced into the dust remover 17 after passing through the combustion gas heater 13, where (i) shows flue gas temperature during air combustion operation and (ii) shows flue gas temperature during oxygen combustion operation.

As shown in FIG. 12, flue gas temperature T1 during air combustion operation is 120° C. to 160° C., but when air combustion operation is changed to oxygen combustion operation, the air flowing through the combustion gas heater 13 is replaced by combustion gas made of a mixture of circulating flue gas and oxygen, decreasing the amount of heat exchanged by the combustion gas heater 13, and consequently flue gas temperature T2 at the outlet of the combustion gas heater 13 and flue gas temperature T3 at the inlet of the dust remover 17 rise to 190° C. to 200° C. If a difference arises between oxygen combustion operation and air combustion operation in the temperature of the flue gas flowing through the first flue 9 between the combustion gas heater 13 and the dust remover 17 in this way, switching between combustion operations will upset thermal balance of the entire system. To maintain the thermal balance, it is necessary to lower the flue gas temperature T3 to approximately the level of the flue gas temperature T1 during oxygen combustion operation as indicated by (iii).

According to the present embodiment, the steam condensate of the boiler 1 is used as a cooling medium to cool the flue gas flowing through the first flue 9 between the combustion gas heater 13 and the dust remover 17. Exchanging heat between the flue gas and steam condensate in this way is useful from the perspective of maintaining the thermal efficiency of the entire system.

Figure 13:
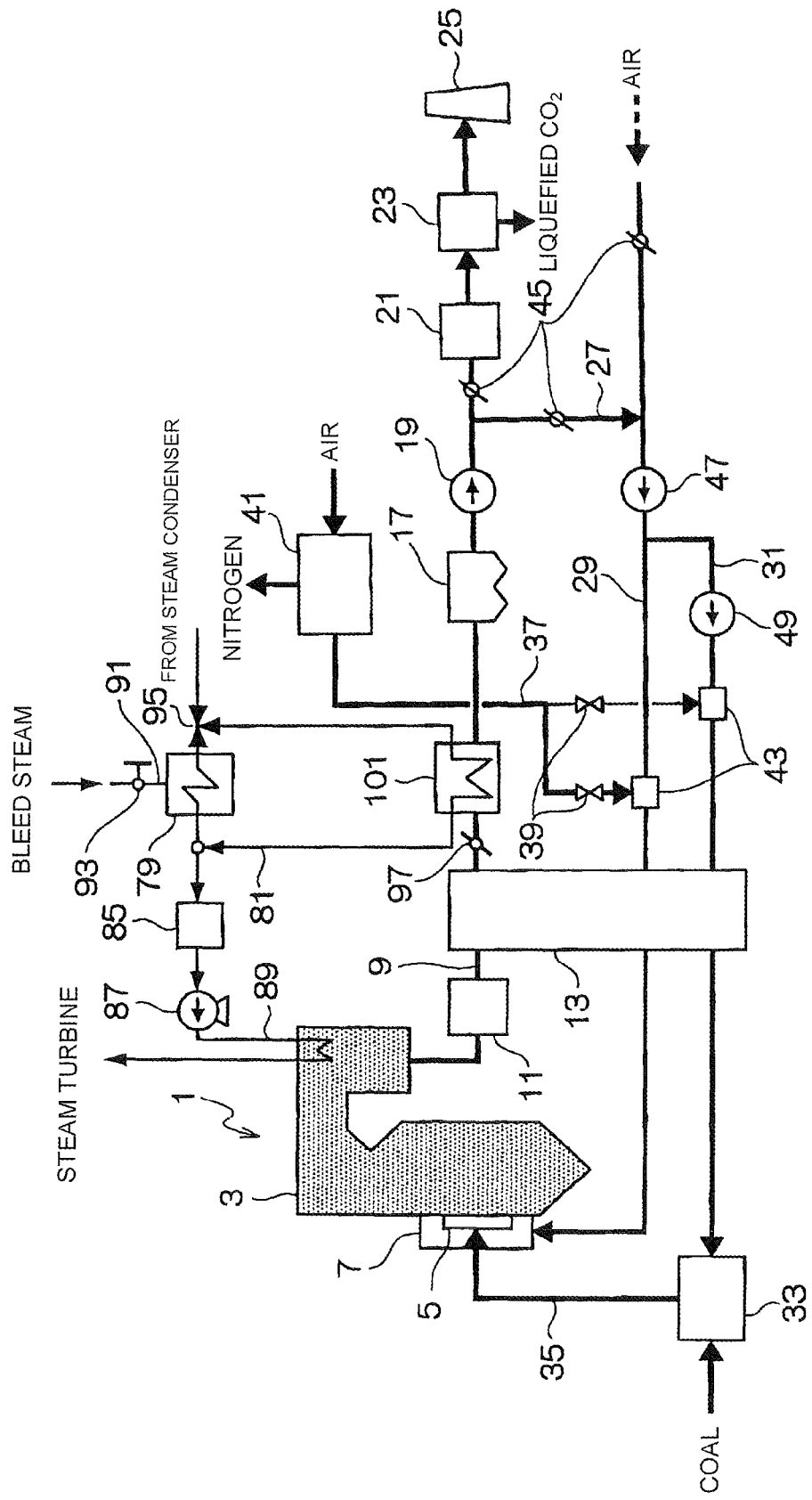
FIG. 13 is a reference example for illustrating the ninth embodiment of the oxygen combustion system resulting from application of the present invention.

Incidentally, conventional oxygen combustion systems are not premised on back and forth switching between air combustion operation and oxygen combustion operation, and thus do not give consideration to maintaining or improving the thermal efficiencies of air combustion operation and oxygen combustion operation under the present conditions. For example, the system shown in FIG. 13 is equipped with a flue gas cooler 101 disposed in an already-existing first flue 9 and is configured to cool the flue gas temperature T2 at the outlet of the combustion gas heater 13 during oxygen combustion operation to approximately the level of the flue gas temperature T1 by switching the steam condensate flow channel from the one through the condensate heater 79 to the one through the flue gas cooler 101. However, during air combustion operation, after passage through the combustion gas heater 13, the temperature of the flue gas has fallen to T1, eliminating the need to cool the flue gas, and consequently the steam condensate flow channel is changed from the one through the flue gas cooler 101 to the one through the condensate heater 79, leaving the flue gas cooler 101 to operate without water in it.

Figure 14:
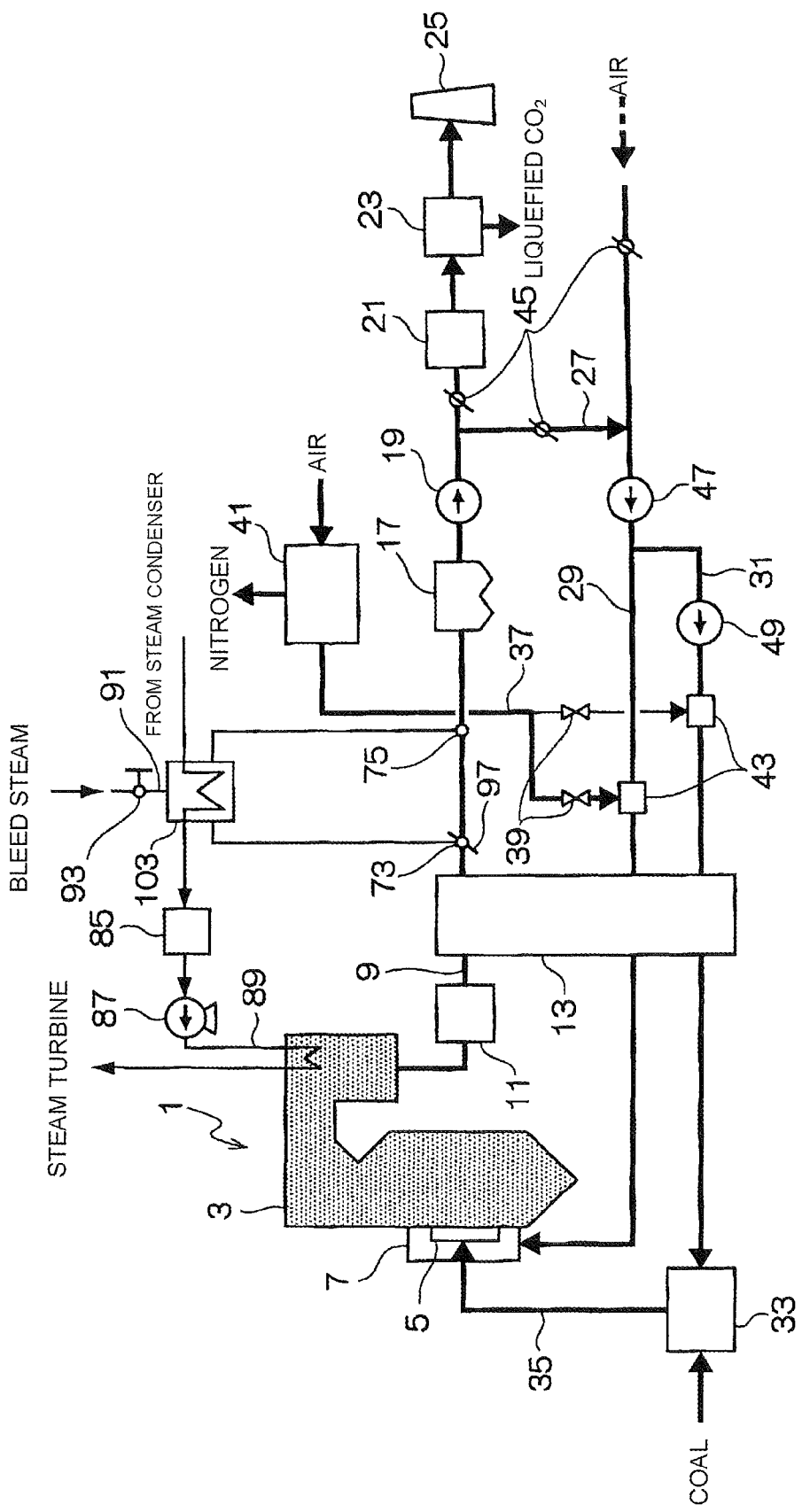
FIG. 14 is a reference example for illustrating the ninth embodiment of the oxygen combustion system resulting from application of the present invention.

On the other hand, the system shown in FIG. 14 is adapted to use one of plural condensate heaters (not shown) also as a flue gas cooler 103 and configured to stop the injection of bleed steam into the flue gas cooler 103 during oxygen combustion operation, allowing the steam condensate to flow into the flue gas cooler 103 and switch the flow channel of the flue gas after passage through the combustion gas heater 13 from the one through the first flue 9 to the one through the flue gas cooler 103 to cool the flue gas temperature T2 at the outlet of the flue gas cooler 103 to approximately the level of the flue gas temperature T1. However, since the flue gas has high ash and sulfur contents, switching from oxygen combustion operation to air combustion operation might cause problems such as contamination of steam condensate and clogging of piping.

Now, operation of the system according to the present embodiment will be described. Referring to FIG. 11, first during air combustion operation, with the damper 45a in the first flue 9 kept open, the damper 45b in the flue gas recirculation duct 27 is closed and the damper 45c on the upstream side of the connection point between the flue gas recirculation duct 27 and the second flue 29 is opened, allowing air to be taken into the second flue 29 through an oxygen introduction port provided at one end of the second flue 29. In so doing, the valves 39 of the oxygen introduction pipe 37 are closed, and thus no oxygen is supplied to the second flue 29. Consequently, the combustion gas heater 13 exchanges heat between the flue gas discharged from the boiler 1 and air.

On the other hand, during oxygen combustion operation, the damper 45b in the flue gas recirculation duct 27 is opened and the damper 45c on the upstream side of the connection point between the flue gas recirculation duct 27 and the second flue 29 is closed, allowing part of the flue gas flowing through the first flue 9 to be extracted and led to the second flue 29 by the flue gas recirculation duct 27. On the other hand, as the valves 39 of the oxygen introduction pipe 37 are opened, oxygen is injected into the second flue 29 and mixed with the flue gas to produce combustion gas. Consequently, the flue gas exchanges heat with the combustion gas in the combustion gas heater 13.

Now, since there is only a small temperature difference between the flue gas and combustion gas flowing through the combustion gas heater 13, when air combustion operation is changed to oxygen combustion operation, the temperature of the flue gas increases after passage through the combustion gas heater 13, changing the thermal balance. Therefore, to maintain the thermal balance, it is necessary to cool the flue gas after passage through the combustion gas heater 13.

Thus, in FIG. 11, during oxygen combustion operation, the damper 97 is adjusted to cause the flue gas to flow through the flue gas cooler 83 after passage through the combustion gas heater 13. Also, in the steam system of the boiler 1, the bleed valve 93 is closed and the switching valve 95 is adjusted to cause the steam condensate to flow through the flue gas cooler 83. Consequently, after passage through the combustion gas heater 13, the flue gas is led to the flue gas cooler 83 by bypassing a flow channel linking the output port 73 and return port 75 of the first flue 9 and cooled in the flue gas cooler 83 by exchanging heat with the steam condensate. After passage through the flue gas cooler 83, the flue gas returns to the return port 75 of the first flue 9, undergoes dust removal by the dust remover 17, and returns to the boiler 1 through the second flue 29 to start recirculation. On the other hand, the steam condensate led to the flue gas cooler 83 is heated through heat exchange with the flue gas and then supplied to the boiler 1 via the deaerator 85 and feed water pump 87. Incidentally, when plural condensate heaters 79 are installed and bypassed by the condensate bypass conduit 81, all the bleed valves 93 installed on the condensate heaters 79 to be bypassed are closed, stopping the supply of bleed steam.

In contrast, during air combustion operation, the damper 97 is adjusted to lead the flue gas flowing past the combustion gas heater 13 to the dust remover 17 by flowing through the first flue 9 without flowing to the flue gas cooler 83. On the other hand, in the steam system of the boiler 1, the switching valve 95 is adjusted to lead the steam condensate to the condensate heaters 79 without flowing to the flue gas cooler 83. In so doing, the bleed valve 93 remains open, causing the steam condensate to be led to the boiler 1 through the deaerator 85 and feed water pump 87 after being heated by the condensate heater 79 through heat exchange with bleed steam.

Incidentally, in order to maintain thermal balance between air combustion operation and oxygen combustion operation, it is necessary that at the time of the oxygen combustion operation, the flue gas after passage through the flue gas cooler 83 has been adjusted to at least 140° C. or below. In particular, to inhibit acid dew-point corrosion and clogging of the duct, the flue gas needs to be introduced into the dust remover 17 at temperatures between 90° C. and 140° C. (both inclusive), as described in the first embodiment. To satisfy this temperature condition, the amount of heat exchanged by the flue gas cooler 83 needs to be kept within an appropriate range. For example, when plural condensate heaters 79 are installed in the steam system of the boiler 1, steam condensate of appropriate temperature is extracted from the piping by taking into consideration the amount of heat exchanged by the flue gas cooler 83, led to the flue gas cooler 83, and returned to piping on the outlet side of the bypassed condensate heater 79. The steam condensate subjected to heat exchange by bypassing the condensate heater 79 during oxygen combustion operation, is heated, during air combustion operation, to a temperature approximately equal to the temperature of the steam condensate flowing past the condensate heater 79 bypassed during oxygen combustion operation.

Next, a configuration example of the flue gas cooler 83 used in the present embodiment will be described. The flue gas cooler 83 according to the present embodiment includes a heat transfer surface made up of a large number of heat exchanger tubes and formed on part of the flue gas bypass conduit 77 and exchanges heat by causing steam condensate to run through the heat exchanger tubes.

Figure 15:
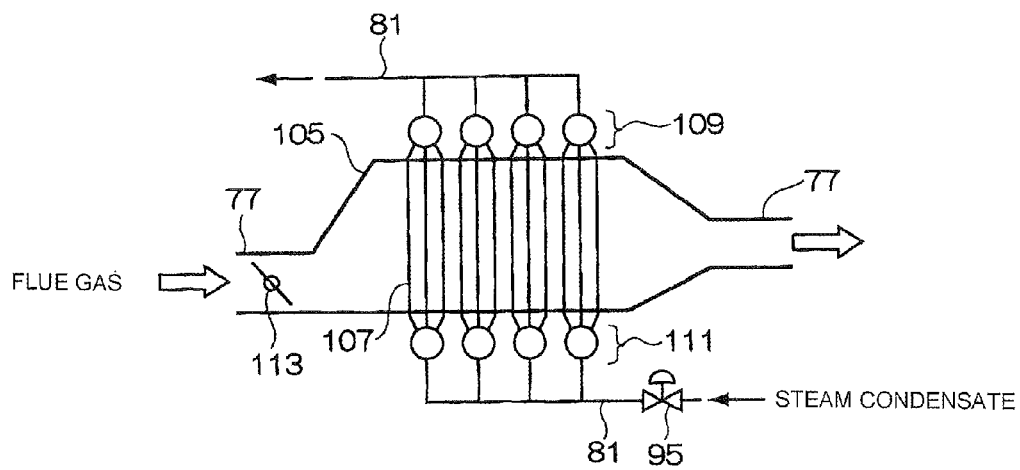
FIG. 15 is a diagram showing a configuration of a flue gas cooler of an oxygen combustion system resulting from application of the present invention.

FIG. 15 shows a structure of the flue gas cooler 83 in which a flow channel of flue gas is placed in a horizontal direction. With this type of flue gas cooler 83, inside a cylindrical body 105 extending in the horizontal direction, plural heat exchanger tubes 107 are disposed in a direction orthogonal to an axial direction of the cylindrical body 105, that is, in a vertical direction. The cylindrical body 105 is connected at opposite ends with the flue gas bypass conduit 77. Outside a cylinder wall of the cylindrical body 105, plural upper headers 109 and plural lower headers 111 are placed opposite each other in the vertical direction by being paired up with each other. Each heat exchanger tube 107 is connected at opposite ends to an upper header 109 and lower header 111, with plural heat exchanger tubes 107 being connected to each pair of the headers. Each upper header 109 and each lower header 111 are connected with a tip of a branch of the condensate bypass conduit 81. A damper 113 is installed in the flue gas bypass conduit 77 on the inlet side of the cylindrical body 105.

Figure 16:
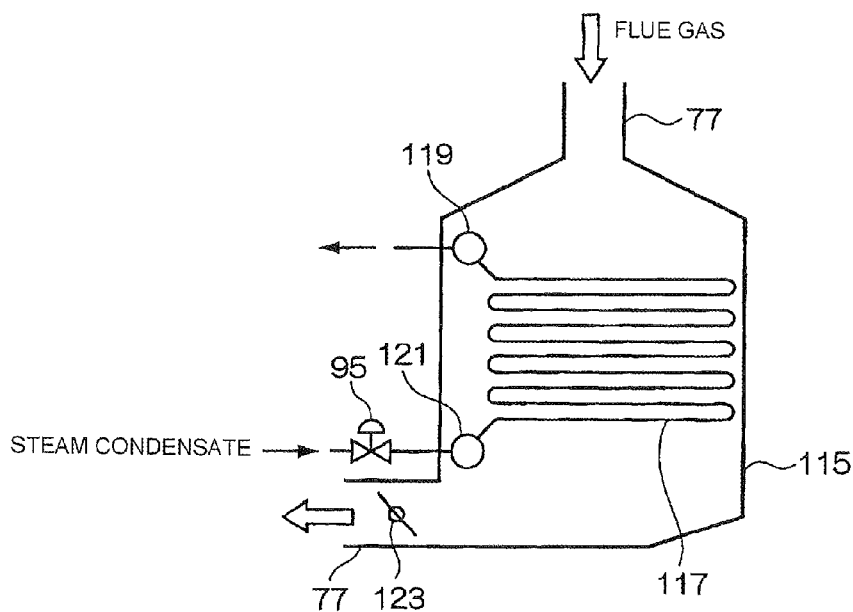
FIG. 16 is a diagram showing a configuration of a flue gas cooler of an oxygen combustion system resulting from application of the present invention.

FIG. 16 shows a structure of the flue gas cooler 83 in which a flow channel of flue gas is placed in the vertical direction. With this type of flue gas cooler 83, inside a cylindrical body 115 extending in the vertical direction, a heat exchanger tube 117 is disposed by being folded multiple times so as to extend in the horizontal direction. The cylindrical body 115 is connected at opposite ends with the flue gas bypass conduit 77. The heat exchanger tube 117 is connected at opposite ends to an upper header 119 and a lower header 121. A damper 123 is installed in the flue gas bypass conduit 77 on the outlet side of the cylindrical body 115.

In either flue gas cooler 83, it is possible to increase a heat transfer area using finned tubes or plate-fin tubes for the heat exchanger tubes 107 or 117 of the heat transfer surface and improve heat transfer efficiency and downsize the flue gas cooler 83 using a staggered arrangement or other similar arrangement. Compared to FIG. 15, although the configuration in FIG. 16 requires a smaller ground space, it is difficult to increase capacity due to constraints of a supporting method for the heat exchanger tubes. On the other hand, a layout pattern of the heat exchanger tubes in FIG. 16 has the advantage of being free of problems such as flow instability because steam condensate runs by creating a single-phase flow (inlet pressure=3.5 MPa to 4.0 MPa; inlet temperature=60° C. to 70° C.; outlet=105° C. to 115° C.).

With the present embodiment, air combustion operation and oxygen combustion operation can be switched back and forth with each other and the flue gas is cooled through heat exchange with steam condensate during oxygen combustion operation such that the temperature of the flue gas introduced into the dust remover 17 will be approximately equal to the temperature of the steam condensate. Consequently, even if air combustion operation and oxygen combustion operation are switched with each other, thermal balance can be maintained between the air combustion operation and oxygen combustion operation, making it possible to maintain or improve thermal efficiency.

Tenth Embodiment

A tenth embodiment of an oxygen combustion system resulting from application of the present invention will be described below with reference to drawings. Incidentally, in the present embodiment, differences from the ninth embodiment will be described, wherein the same components as those in the ninth embodiment are denoted by the same reference numerals as the corresponding components in the ninth embodiment, and description thereof will be omitted.

Figure 17:
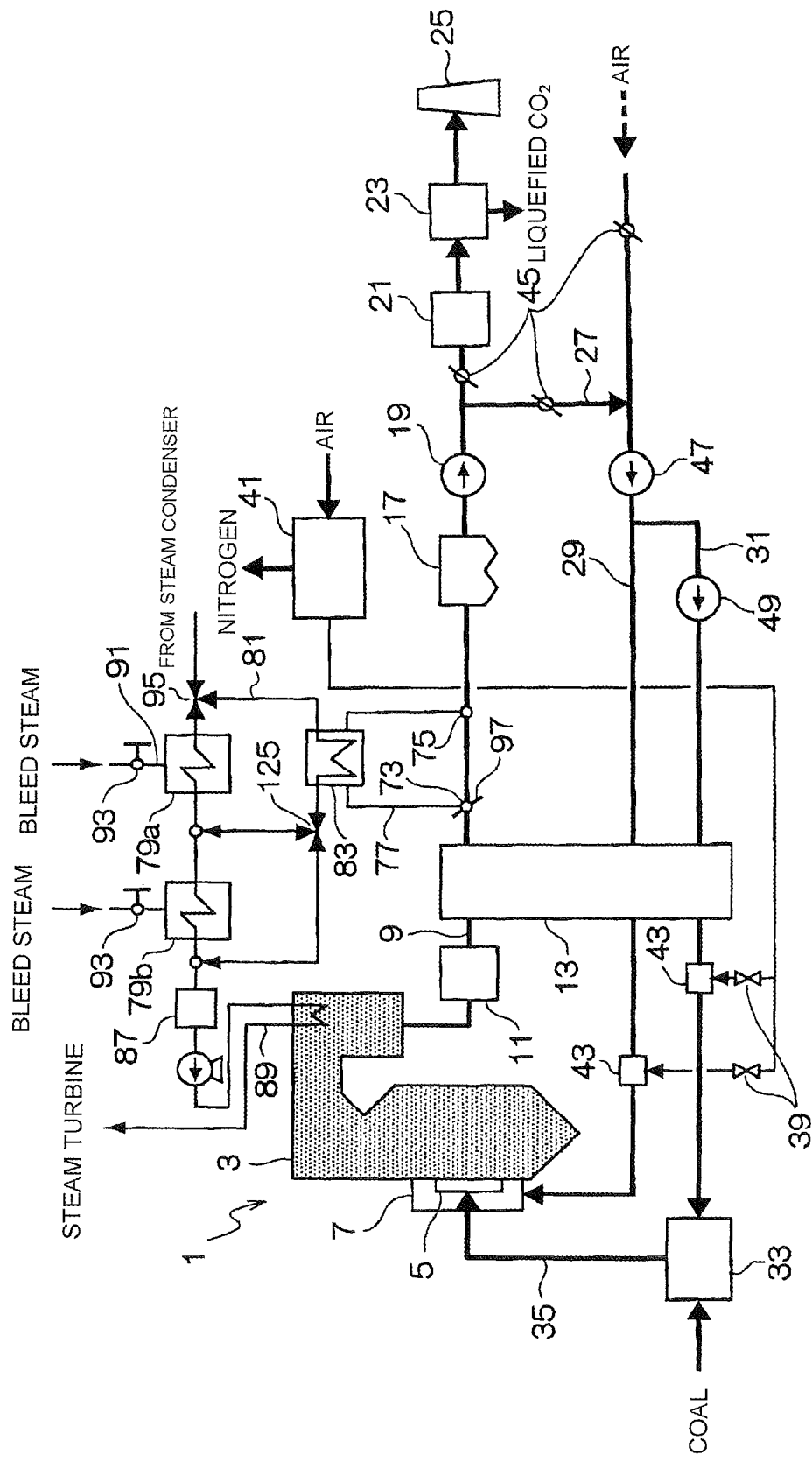
FIG. 17 is a system diagram showing a configuration of a tenth embodiment of an oxygen combustion system resulting from application of the present invention.

As shown in FIG. 17, the present embodiment differs in configuration from the ninth embodiment in that the oxygen mixing device 43 is installed both on the second flue 29 on the downstream side of the combustion gas heater 13 and on the fuel transport gas duct 31 on the downstream side of the combustion gas heater 13 and that the number of condensate heaters 79 to be bypassed by the condensate bypass conduit 81 is adjustable.

The configuration of the present embodiment is suitable when combustion gas leaks badly from the combustion gas heater 13 and a massive amount of oxygen contained in the combustion gas leaks into the flue gas or when mixed gas with a high oxygen concentration is not supplied to the coal pulverizer 33. That is, by changing an installation location of the oxygen mixing device 43 from the upstream side to the downstream side of the combustion gas heater 13, it is possible to prevent oxygen from leaking into the flue gas via the combustion gas heater 13. Incidentally, introduction position of oxygen is not limited to that of the present embodiment, and oxygen may be supplied directly to the burner 5 or wind box 7 of the boiler 1.

Also, according to the present embodiment, the temperature of the combustion gas introduced into the combustion gas heater 13 through the second flue 29 during oxygen combustion operation is approximately 20° C. higher than with the configuration in FIG. 11, decreasing the amount of heat exchanged by the combustion gas heater 13. Consequently, the temperature of the flue gas flowing through the first flue 9 after flowing past the combustion gas heater 13 is approximately 20° C. higher, resulting in an increase in the temperature of the steam condensate subjected to heat exchange by the flue gas cooler 83.

In this regard, according to the present embodiment, the switching valve 125 is installed on the condensate bypass conduit 81, making it possible to detect the temperature of the steam condensate after heat exchange and switch the location to which the steam condensate is to be returned, according to the detected temperature of the steam condensate. For example, if the temperature of the steam condensate subjected to heat exchange by the flue gas cooler 83 rises above a prescribed temperature of an outlet portion of the condensate heater 79a on the upstream side in FIG. 17, i.e., the temperature during air combustion operation, the bypassed steam condensate is returned to the outlet portion of the condensate heater 79b on the downstream side. This makes it possible, for example, to supply steam condensate of proper temperature to the boiler 1 and curb decreases in the thermal efficiency of the steam system of the boiler.

While embodiments of the present invention have been described in detail above with reference to the drawings, it should be noted that the embodiments described above are only exemplary of the present invention and that the present invention is not limited to the configurations of the embodiments described above. Needless to say, even if the configurations are subjected to design changes or the like without departing from the spirit and scope of the present invention, the resulting configurations are also included in the present invention. For example, using the first embodiment as a basic configuration, characteristic techniques of any of the fourth embodiment, sixth embodiment, ninth embodiment, and the like may be added or may be combined as appropriate.

The invention claimed is:

1. An oxygen combustion system comprising:
   a boiler adapted to burn fuel using combustion gas composed of a mixture of oxygen-rich gas and circulating flue gas containing 25% to 40% of water;
   a dust remover disposed in a flue through which flue gas discharged from the boiler flows;
   a combustion gas pipe adapted to lead the combustion gas to the boiler, the combustion gas being made by mixing the circulating flue gas extracted from the flue on a downstream side of the dust remover with the oxygen-rich gas;
   a combustion gas heater adapted to exchange heat between the flue gas flowing through the flue between the boiler and the dust remover and the combustion gas flowing through the combustion gas pipe;
   a flue gas cooler disposed in the flue between the combustion gas heater and the dust remover and adapted to cool the flue gas by exchanging heat between the flue gas running through the flue and a cooling medium; and
   control means adapted to control at least one of a flow rate and temperature of the cooling medium of the flue gas cooler such that temperature of the flue gas introduced into the dust remover will be between and including 90° C. and 140° C., wherein $SO_3$ in the flue gas condenses on an inlet side of the dust remover, forming sulfuric acid mist, and is removed by the dust remover, sticking to soot particles in the flue gas, and temperature of the flue gas never falls below an acid dew-point temperature, and acid dew-point corrosion and clogging with soot particles of ducts are inhibited.

2. The oxygen combustion system according to claim 1, further comprising:
   an air separator adapted to produce the oxygen-rich gas by separating nitrogen from air; and
   an oxygen introduction channel used to introduce the oxygen-rich gas produced by the air separator into the combustion gas pipe on an upstream side of the combustion gas heater, wherein
   the oxygen introduction channel is provided with heating means adapted to heat oxygen flowing through the oxygen introduction channel.

3. The oxygen combustion system according to claim 1, further comprising:
   an air introduction port adapted to introduce air into the combustion gas pipe;
   a first valve unit adapted to switch gas to be introduced into the combustion gas pipe between the circulating flue gas and air; wherein
   the first valve unit comprises a damper disposed in a duct adapted to introduce the circulating flue gas into the combustion gas pipe, and a damper disposed in a duct being provided at one end of an air introduction port adapted to introduce air into the combustion gas pipe;
   a condensate heater adapted to exchange heat between steam condensate obtained by a steam condenser of a steam system of the boiler and bleed steam, and to supply the steam condensate heated by the condensate heater to the boiler;
   a bleed valve installed on a steam introduction conduit of the condensate heater and adapted to adjust an amount of the bleed steam introduced into the condensate heater;
   a condensate bypass conduit adapted to bypass the condensate heater and to supply the steam condensate to the boiler bypassing the condensate heater;
   a second valve unit adapted to switch a flow channel of the steam condensate supplied to the boiler by running through between the condensate heater and the condensate bypass conduit;
   a flue gas bypass conduit adapted to allow the flue gas to run by bypassing a flow channel which links an output port disposed in the flue between the combustion gas heater and the dust remover with a return port on the downstream side of the output port; and a third valve unit adapted to switch a flow channel of the flue gas between the flue and the flue gas bypass conduit, wherein the flue gas cooler is configured to be able to exchange heat between the steam condensate running through the condensate bypass conduit and the flue gas running through the flue gas bypass conduit;

during oxygen combustion operation, the first valve unit is switched to the circulating flue gas, the bleed valve is closed, the second valve unit is switched to the condensate bypass conduit, the third valve unit is switched to the flue gas bypass conduit and then the flue gas is cooled by the condensate;

during air combustion operation, the first valve unit is switched to the air, the second valve unit is switched to the condensate heater, the bleed valve is opened, the third valve unit is switched to the flue and then the flue gas is able to stop cooling.

4. The oxygen combustion system according to claim 1, further comprising:

a working gas supply device adapted to supply working gas which is used in an ancillary device of at least one of the boiler and a flue gas treatment system and intrudes into the flue gas, the flue gas treatment system being adapted to purify the flue gas discharged from the boiler, wherein the working gas supply device uses the flue gas from which soot particles have been collected by the dust remover, as the working gas.

5. An oxygen combustion system comprising:

a boiler adapted to burn fuel using combustion gas composed of a mixture of oxygen-rich gas and circulating flue gas;

a dust remover disposed in a flue through which flue gas discharged from the boiler flows;

a combustion gas pipe adapted to lead the combustion gas to the boiler, the combustion gas being made by mixing the circulating flue gas extracted from the flue on a downstream side of the dust remover with the oxygen-rich gas;

a combustion gas heater adapted to exchange heat between the flue gas flowing through the flue between the boiler and the dust remover and the combustion gas flowing through the combustion gas pipe;

a flue gas cooler disposed in the flue between the combustion gas heater and the dust remover and adapted to cool the flue gas by exchanging heat between the flue gas running through the flue and a cooling medium;

control means adapted to control at least one of a flow rate and temperature of the cooling medium of the flue gas cooler such that temperature of the flue gas introduced into the dust remover will be between and including 90° C. and 140° C., wherein $SO_3$ in the flue gas condenses on an inlet side of the dust remover, forming sulfuric acid mist, and is removed by the dust remover, sticking to soot particles in the flue gas, and temperature of the flue gas never falls below an acid dew-point temperature, and acid dew-point corrosion and clogging with soot particles of ducts are inhibited;

an air separator adapted to produce the oxygen-rich gas by separating nitrogen from air;

an oxygen introduction channel used to introduce the oxygen-rich gas produced by the air separator into the combustion gas pipe on an upstream side of the combustion gas heater, the oxygen introduction channel being provided with heating means adapted to heat oxygen flowing through the oxygen introduction channel;

a first valve unit adapted to switch gas to be introduced into the combustion gas pipe between the circulating flue gas and air, wherein the first valve unit comprises a damper disposed in a duct adapted to introduce the circulating flue gas into the combustion gas pipe, and a damper disposed in a duct being provided at one end of an air introduction port adapted to introduce air into the combustion gas pipe;

a condensate heater adapted to exchange heat between steam condensate obtained by a steam condenser of a steam system of the boiler and bleed steam, and to supply the steam condensate heated by the condensate heater to the boiler;

a bleed valve installed on a steam introduction conduit of the condensate heater and adapted to adjust an amount of the bleed steam introduced into the condensate heater;

a condensate bypass conduit adapted to bypass the condensate heater and to supply the steam condensate to the boiler bypassing the condensate heater;

a second valve unit adapted to switch a flow channel of the steam condensate supplied to the boiler by running through between the condensate heater and the condensate bypass conduit;

a flue gas bypass conduit adapted to allow the flue gas to run by bypassing a flow channel which links an output port disposed in the flue between the combustion gas heater and the dust remover with a return port on the downstream side of the output port; and a third valve unit adapted to switch a flow channel of the flue gas between the flue and the flue gas bypass conduit, wherein the flue gas cooler is configured to be able to exchange heat between the steam condensate running through the condensate bypass conduit and the flue gas running through the flue gas bypass conduit;

during oxygen combustion operation, the first valve unit is switched to the circulating flue gas, the bleed valve is closed, the second valve unit is switched to the condensate bypass conduit, the third valve unit is switched to the flue gas bypass conduit and then the flue gas is cooled by the condensate; and during air combustion operation, the first valve unit is switched to the air, the second valve unit is switched to the condensate heater, the bleed valve is opened, the third valve unit is switched to the flue and then the flue gas is able to stop cooling.

6. The oxygen combustion system according to claim 1, further comprising:

an air separator adapted to produce the oxygen-rich gas by separating nitrogen from air;

an oxygen introduction channel used to introduce the oxygen-rich gas produced by the air separator into the combustion gas pipe on an upstream side of the combustion gas heater, the oxygen introduction channel being provided with heating means adapted to heat oxygen flowing through the oxygen introduction channel; and a working gas supply device adapted to supply working gas which is used in an ancillary device of at least one of the boiler and a flue gas treatment system and intrudes into the flue gas, the flue gas treatment system being adapted to purify the flue gas discharged from the boiler, wherein the working gas supply device uses the flue gas from which soot particles have been collected by the dust remover, as the working gas.

7. An oxygen combustion system comprising:

a boiler adapted to burn fuel using combustion gas composed of a mixture of oxygen-rich gas and circulating flue gas;

a dust remover disposed in a flue through which flue gas discharged from the boiler flows;

a combustion gas pipe adapted to lead the combustion gas to the boiler, the combustion gas being made by mixing the circulating flue gas extracted from the flue on a downstream side of the dust remover with the oxygen-rich gas;

a combustion gas heater adapted to exchange heat between the flue gas flowing through the flue between the boiler and the dust remover and the combustion gas flowing through the combustion gas pipe;

a flue gas cooler disposed in the flue between the combustion gas heater and the dust remover and adapted to cool the flue gas by exchanging heat between the flue gas running through the flue and a cooling medium;

control means adapted to control at least one of a flow rate and temperature of the cooling medium of the flue gas cooler such that temperature of the flue gas introduced into the dust remover will be between and including 90° C. and 140° C., wherein $SO_3$ in the flue gas condenses on an inlet side of the dust remover, forming sulfuric acid mist, and is removed by the dust remover, sticking to soot particles in the flue gas, and temperature of the flue gas never falls below an acid dew-point temperature, and acid dew-point corrosion and clogging with soot particles of ducts are inhibited;

a first valve unit adapted to switch gas to be introduced into the combustion gas pipe between the circulating flue gas and air; wherein the first valve unit comprises a damper disposed in a duct adapted to introduce the circulating flue gas into the combustion gas pipe, and a damper disposed in a duct being provided at one end of an air introduction port adapted to introduce air into the combustion gas pipe;

a condensate heater adapted to exchange heat between steam condensate obtained by a steam condenser of a steam system of the boiler and bleed steam, and to supply the steam condensate heated by the condensate heater to the boiler;

a bleed valve installed on a steam introduction conduit of the condensate heater and adapted to adjust an amount of the bleed steam introduced into the condensate heater;

a condensate bypass conduit adapted to bypass the condensate heater and to supply the steam condensate to the boiler bypassing the condensate heater;

a second valve unit adapted to switch a flow channel of the steam condensate supplied to the boiler by running through between the condensate heater and the condensate bypass conduit;

a flue gas bypass conduit adapted to allow the flue gas to run by bypassing a flow channel which links an output port disposed in the flue between the combustion gas heater and the dust remover with a return port on the downstream side of the output port;

a third valve unit adapted to switch a flow channel of the flue gas between the flue and the flue gas bypass conduit, wherein the flue gas cooler is configured to be able to exchange heat between the steam condensate running through the condensate bypass conduit and the flue gas running through the flue gas bypass conduit;

during oxygen combustion operation, the first valve unit is switched to the circulating flue gas, the bleed valve is closed, the second valve unit is switched to the condensate bypass conduit, the third valve unit is switched to the flue gas bypass conduit and then the flue gas is cooled by the condensate;

during air combustion operation, the first valve unit is switched to the air, the second valve unit is switched to the condensate heater, the bleed valve is opened, the third valve unit is switched to the flue and the flue gas is able to stop cooling;

a working gas supply device adapted to supply working gas which is used in an ancillary device of at least one of the boiler and a flue gas treatment system and intrudes into the flue gas, the flue gas treatment system being adapted to purify the flue gas discharged from the boiler; and wherein the working gas supply device uses the flue gas from which soot particles have been collected by the dust remover, as the working gas.

8. An oxygen combustion system comprising:

a boiler adapted to burn fuel using combustion gas composed of a mixture of oxygen-rich gas and circulating flue gas;

a dust remover disposed in a flue through which flue gas discharged from the boiler flows;

a combustion gas pipe adapted to lead the combustion gas to the boiler, the combustion gas being made by mixing the circulating flue gas extracted from the flue on a downstream side of the dust remover with the oxygen-rich gas;

a combustion gas heater adapted to exchange heat between the flue gas flowing through the flue between the boiler and the dust remover and the combustion gas flowing through the combustion gas pipe;

a flue gas cooler disposed in the flue between the combustion gas heater and the dust remover and adapted to cool the flue gas by exchanging heat between the flue gas running through the flue and a cooling medium;

control means adapted to control at least one of a flow rate and temperature of the cooling medium of the flue gas cooler such that temperature of the flue gas introduced into the dust remover will be between and including 90° C. and 140° C., wherein $SO_3$ in the flue gas condenses on an inlet side of the dust remover, forming sulfuric acid mist, and is removed by the dust remover, sticking to soot particles in the flue gas, and temperature of the flue gas never falls below an acid dew-point temperature, and acid dew-point corrosion and clogging with soot particles of ducts are inhibited;

an air separator adapted to produce the oxygen-rich gas by separating nitrogen from air;

an oxygen introduction channel used to introduce the oxygen-rich gas produced by the air separator into the combustion gas pipe on an upstream side of the combustion gas heater, the oxygen introduction channel being provided with heating means adapted to heat oxygen flowing through the oxygen introduction channel;

a first valve unit adapted to switch gas to be introduced into the combustion gas pipe between the circulating flue gas and air; wherein
the first valve unit comprises a damper disposed in a duct adapted to introduce the circulating flue gas in the combustion gas pipe, and a damper disposed in a duct being provided at one end of an air introduction port adapted to introduce air into the combustion gas pipe;
a condensate heater adapted to exchange heat between steam condensate obtained by a steam condenser of a steam system of the boiler and bleed steam, and to supply the steam condensate heated by the condensate heater to the boiler;
a bleed valve installed on a steam introduction conduit of the condensate heater and adapted to adjust an amount of the bleed steam introduced into the condensate heater;
a condensate bypass conduit adapted to bypass the condensate heater and to supply the steam condensate to the boiler bypassing the condensate heater;
a second valve unit adapted to switch a flow channel of the steam condensate supplied to the boiler by running through between the condensate heater and the condensate bypass conduit;
a flue gas bypass conduit adapted to allow the flue gas to run by bypassing a flow channel which links an output port disposed in the flue between the combustion gas heater and the dust remover with a return port on the downstream side of the output port;
a third valve unit adapted to switch a flow channel of the flue gas between the flue and the flue gas bypass conduit; wherein
the flue gas cooler is configured to be able to exchange heat between the steam condensate running through the condensate bypass conduit and the flue gas running through the flue gas bypass conduit;
during oxygen combustion operation, the first valve unit is switched to the circulating flue gas, the bleed valve is closed, the second valve unit is switched to the condensate bypass conduit, the third valve unit is switched to the flue gas bypass conduit and then the flue gas is cooled by the condensate;
during air combustion operation, the first valve unit is switched to the air, the second valve unit is switched to the condensate heater, the bleed valve is open, the third valve unit is switched to the flue and then the flue gas is able to stop cooling;

a working gas supply device adapted to supply working gas which is used in an ancillary device of at least one of the boiler and a flue gas treatment system and intrudes into the flue gas, the flue gas treatment system being adapted to purify the flue gas discharged from the boiler; and
the working gas supply device uses the flue gas from which soot particles have been collected by the dust remover, as the working gas.

9. An operating method for an oxygen combustion system which comprises: a boiler adapted to burn fuel using combustion gas composed of a mixture of oxygen-rich gas and circulating flue gas containing 25% to 40% of water; a dust remover disposed in a flue through which flue gas discharged from the boiler flows; a combustion gas pipe adapted to lead the combustion gas to the boiler, the combustion gas being made by mixing the circulating flue gas extracted from the flue on a downstream side of the dust remover with the oxygen-rich gas; a combustion gas heater adapted to exchange heat between the flue gas flowing through the flue between the boiler and the dust remover and the combustion gas flowing through the combustion gas pipe; and a flue gas cooler disposed in the flue between the combustion gas heater and the dust remover and adapted to cool the flue gas by exchanging heat between the flue gas running through the flue and a cooling medium, wherein
the operating method adjusts temperature of the flue gas passing through the flue gas cooler so as to keep the temperature of the flue gas introduced into the dust remover between and including 90° C. and 140° C. during oxygen combustion operation which involves burning the fuel by supplying combustion gas to the boiler, wherein $SO_3$ in the flue gas condenses on an inlet side of the dust remover, forming sulfuric acid mist, and is removed by the dust remover, sticking to soot particles in the flue gas, and temperature of the flue gas never falls below an acid dew-point temperature, and acid dew-point corrosion and clogging with soot particles of ducts are inhibited.

10. The oxygen combustion system according to claim 1, wherein the control means is adapted to control the temperature of the flue gas introduced into the dust remover to a predetermined temperature between and including 90° C. and 140° C.

* * * * *

UNITED STATES PATENT AND TRADEMARK OFFICE
CERTIFICATE OF CORRECTION

PATENT NO. : 9,513,000 B2  
APPLICATION NO. : 13/825157  
DATED : December 6, 2016  
INVENTOR(S) : Marumoto et al.

Page 1 of 1

It is certified that error appears in the above-identified patent and that said Letters Patent is hereby corrected as shown below:

On the Title Page

Item (75): Delete
"Takahiro Marumoto, Kure (JP);
Hidehisa Yoshizako, Kure (JP);
Kenji Kiyama, Kure (JP);
Kenso Arita, Kure (JP)
Pauli Dernjatin, Helsinki (FI)"

and insert
-- Takahiro Marumoto, Hiroshima (JP);
Hidehisa Yoshizako, Hiroshima (JP);
Kenji Kiyama, Hiroshima (JP);
Kenso Arita, Hiroshima (JP);
Pauli Dernjatin, Espoo (FI) --

Signed and Sealed this  
Twenty-first Day of February, 2017

Michelle K. Lee  
*Director of the United States Patent and Trademark Office*